(12) United States Patent
Maeda et al.

(10) Patent No.: US 6,791,703 B1
(45) Date of Patent: Sep. 14, 2004

(54) IMAGE PROCESSING APPARATUS AND METHOD, AND STORAGE MEDIUM THEREFOR

(75) Inventors: Toru Maeda, Mitaka (JP); Kenzou Sekiguchi, Machida (JP); Ritsushi Tanabe, Yokohama (JP); Kotaro Yamaguchi, Kawasaki (JP); Hiroyuki Yaguchi, Inagi (JP); Kenji Aiyama, Yokohama (JP); Tomohiro Akiba, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/309,520

(22) Filed: May 10, 1999

(30) Foreign Application Priority Data

| Jun. 5, 1909 | (JP) | ........................................... 10-172137 |
| May 11, 1998 | (JP) | ........................................... 10-127281 |
| May 11, 1998 | (JP) | ........................................... 10-127282 |

(51) Int. Cl.$^7$ ............................................. G06F 15/00
(52) U.S. Cl. ..................................... 358/1.15; 358/1.16
(58) Field of Search .............................. 358/1.15, 1.16, 358/1.13; 707/520, 526, 530, 527, 525, 517

(56) References Cited

U.S. PATENT DOCUMENTS

| 6,166,826 | A | * | 12/2000 | Yokoyama | .................. 358/1.16 |
| 6,184,996 | B1 | * | 2/2001 | Gase | .......................... 358/1.15 |
| 6,519,048 | B1 | * | 2/2003 | Tanaka | ....................... 358/1.13 |

* cited by examiner

*Primary Examiner*—Twyler Lamb
(74) *Attorney, Agent, or Firm*—Fitzpatrick, Cella, Harper & Scinto

(57) ABSTRACT

An image processing apparatus allows a user to obtain only data on a desirable WWW (World Wide Web) server and print the obtained data. The image processing apparatus, which accesses HTML (HyperText Markup Language) data on a WWW server in accordance with designated address information and which prints the HTML data, allows for requesting of a source that specifies the address information an acceptance for the accessing or printing of data other than those data that correspond to the designated address information and that are linked with the pertinent data, and when the acceptance requested cannot be obtained from the source that specifies the address information, halts access or printing of the data other than data that correspond to the designated address information and that are linked with the pertinent data.

54 Claims, 34 Drawing Sheets

FIG. 5

| FIG. 5A |
|---|
| FIG. 5B |

FIG. 5A

| NO. | ITEM | CONTENTS | DEFAULT |
|---|---|---|---|
| 1 | DOCUMENT TITLE | CHR TRAIN | NONE |
| 2 | URL | CHR TRAIN | NONE |
| 3 | PRINTER ADDRESS | CHR TRAIN | NONE |
| 4 | USER NAME | CHR TRAIN | NONE |
| 5 | OPTION FILE | CHR TRAIN | defaulthpi |
| 6 | LINK LEVEL | 0–10 | 0 |
| 7 | MAX PRINT PAGES | 0–100 | 0 |
| 8 | PRINT OVER MAX PRINT PAGES | YES/NO | YES |
| 9 | GO TO OTHER SITE | YES/NO | NO |
| 10 | PRINT LINK MAP | YES/NO | NO |
| 11 | PRINT PAGE NO. | YES/NO | YES |
| 12 | PRINT DATE | YES/NO | YES |
| 13 | PRINT URL | YES/NO | YES |
| 14 | PRINT DOCUMENT TITLE | YES/NO | YES |
| 15 | HEADER | CHR TRAIN | NONE |
| 16 | HEADER POSITION | right/center/left | right |
| 17 | PRINT BACKGROUND | YES/NO | NO |
| 18 | CHAPTER NO. FOR <H> TAGS | YES/NO | NO |
| 19 | PRINT HYPER LINKED DOCUMENT FIRST | YES/NO | NO |
| 20 | SCALE | 50–200/2up–16up | 100 |

 A

FIG. 5B

| 21 | SCALE DOWN AT BOUDARY PAGE | 20-100 | 100 |
|---|---|---|---|
| 22 | FONT NAME | CHR TRAIN | NONE |
| 23 | FONT SIZE | small/medium/large | medium |
| 24 | FONT WEIGHT | bold/regular/light | regular |
| 25 | USE STYLE SHEET | YES/NO | NO |
| 26 | STYLE SHEET NAME | CHR TRAIN | NONE |
| 27 | PAPER SIZE | Letter/Legal/11×17/Statement/A3/A4/A5/B4/B5 | Letter |
| 28 | ORIENTATION | Portrait/Landscape | Portrait |
| 29 | MARGIN | 0-10 | 1 |
| 30 | COPIES | 1-99 | 1 |
| 31 | SORTER | none/normal/staple/group | none |
| 32 | RESOLUTION | 300/400/600 | 600 |
| 33 | DUPLEX | YES/NO | NO |
| 34 | ENABLE SCHEDULE | no/once/weekly/monthly/repeate | no |
| 35 | DAY | Sunday-Saturday | NONE |
| 36 | DATE | YEAR/MONTH/DAY | NONE |
| 37 | TIME | HOUR/MINUTE | NONE |
| 38 | CYCLE | DAY/HOUR | NONE |
| 39 | PRINT MODIFIED ONLY | YES/NO | NO |

FIG. 12

| Owner | Host | Job No. | Job Name | Schedule |
|---|---|---|---|---|
| Michael | PC001 | 1 | www.can.co.jp | |
| Paul | PC123 | 2 | www.can.com | Weekly |
| Michael | PC001 | 3 | www.cis.com | Monthly |
| Paul | PC123 | 4 | www/can.co.jp | |

Delete — 608

Close

FIG. 14A
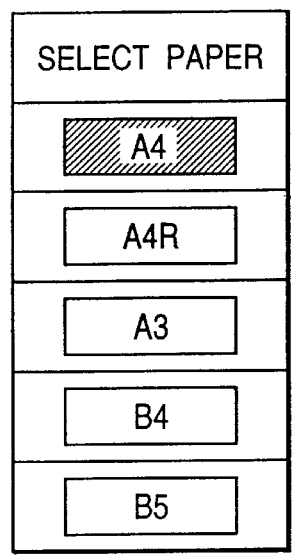
FIG. 14B
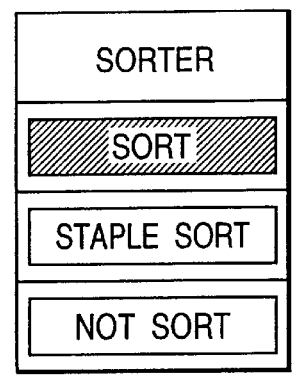
FIG. 16
DESIGNATE PRINT TIME  341  342  343
340 — Once | Weekly | Monthly | Repeat
344 — Sun | Mon | Tue | Wen | Thu | Fri | Sat
345 — Date : 1997/10/07 (yyyy/mm/dd)
346 — Time : 01:30 (hh:mm)
347 — Cycle : 00/04 (dd/hh)
OK — 348

FIG. 18

TIME DESIGNATION LIST — 366

| No. | URL | PRINT DAY | PRINT TIME |
|---|---|---|---|
| 1 | http://www.abcdefg.co.jp/ | MON-FRI | 0:00 |
| 2 | http://www.aaaa.co.jp/ | EVERY 10 DAYS | 1:00 |
| 3 | http://www.bbbb.com/ | 1997/10/10 | 2:30 |
| 4 | http://www.cccc.co.jp/ | MONTHLY | 0:00 |
| 5 | http://www.dddd.co.jp/ | EVERY 4 HOURS | 3:00 |

367 — PRINT DAY column
368 — PRINT TIME column
369 — ←
370 — →
371 — DELETE

360–364 — rows 1–5

FIG. 20

| LOG LIST | | | | |
|---|---|---|---|---|
| No. | URL | DATE | TIME | RESULT |
| 1 | http://www.abcdefg.co.jp/ | 1997/10/07 | 12:30 | NORMAL |
| 2 | http://www.aaaa.co.jp/ | 1997/10/08 | 10:00 | RESET |
| 3 | http://www.bbbb.com/ | 1997/10/09 | 2:30 | ERROR |
| 4 | http://www.cccc.co.jp/ | 1997/10/10 | 0:00 | NORMAL |
| 5 | http://www.dddd.co.jp/ | 1997/10/10 | 1:00 | NORMAL |

FIG. 21
FIG. 22
FIG. 23

FIG. 29

```
START_OF_NETRETRIVER_PARAMETERS
[JobControl]
Homepage=http://www.canon.co.jp/index.htm    (2)
LinkLevel=0                                   (6)
MaxPrintNum=0                                 (7)
EndAfterComp=yes                              (8)
GoOtherSite=yes                               (9)
[AdditionalInfo]
PrintLinkMap=yes                              (10)
PrintPageNum=yes                              (11)
PrintDate=yes                                 (12)
PrintURL=yes                                  (13)
PrintTitle=yes                                (14)
HeaderText=""                                 (15)
HeaderPos=right                               (16)
[Style]
DrawBackground=no                             (17)
HeaderNumOn=no                                (18)
NestFirst=no                                  (19)
Ratio=100                                     (20)
MinImgScaleAtPaging=100                       (21)
StyleSheet=yes                                (25)
CSS=http://www.canon.co.jp/style.css          (26)
[CSSFont]
FontFace=none                                 (22)
FontSize=regular                              (23)
FontWeight=medium                             (24)
[PostScript]
PageSize=letter                               (27)
Orientation=portrait                          (28)
LeftMargin=25                                 (29)
RightMargin=15                                (29)
TopMargin=15                                  (29)
BottomMargin=20                               (29)
NumberOfCopies=3                              (30)
Sorter=staple                                 (31)
Resolution=600                                (32)
Duplex=yes                                    (33)
[Schedule]
Schedule=Weekly                               (34)
Sun=yes                                       (35)
Mon=no                                        (35)
Tue=yes                                       (35)
Wed=no                                        (35)
Thu=yes                                       (35)
Fri=no                                        (35)
Sat=no                                        (35)
Date=0401                                     (36)
Time=2210                                     (37)
Cycle=0004                                    (38)
ModifiedOnly=no                               (39)
```

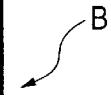
B

FIG. 30

| "HPC001" | LF | "Jwww.canon.co.jp" | LF | "PMichael" | LF | "Wpassword" |

H—Host name
J—Job name
P—User name
W—Password

FIG. 31A

LPR COMMAND FORMAT

| COMMAND ID (LPR) | 03h | DATA FILE LENGTH | SP (20h) | DATA FILE NAME | LF (0Ah) | 02h | CONTROL FILE LENGTH | SP (20h) | CONTROL FILE NAME | DATA FILE | CONTROL FILE |
|---|---|---|---|---|---|---|---|---|---|---|---|

FIG. 31B

LPQ COMMAND FORMAT

| COMMAND ID (LPQ) | 03h | PRINTER QUEUE NAME | SP (20h) | JOB NO. LIST | LF (0Ah) |
|---|---|---|---|---|---|

FIG. 31C

LPRM COMMAND FORMAT

| COMMAND ID (LPRM) | 05h | PRINTER QUEUE NAME | SP (20h) | USER NAME | SP (20h) | PASSWORD | SP (20h) | JOB NO. LIST | LF (0Ah) |
|---|---|---|---|---|---|---|---|---|---|

FIG. 32

| Monitor | | | | _ □ × |
|---|---|---|---|---|
| Owner | Host | Job No. | Job Name | Schedule |
| Michael | PC001 | 1 | www.canon.co.jp | Weekly |
| | | | | |
| | | | | |
| DELETE | | | | CLOSE |

URL Access Confirmation
http://www.cfs.canon.com

| Confirm ACCESS | | Not ACCESS |
|---|---|---|
| 3201 | | 3202 |

FIG. 36
URL ACCESS ACCEPTANCE REQUEST

| COMMAND ID (LPQ) | 03h | URL ACCESS ACCEPTANCE REQUEST ID | SP (20h) | URL NAME | LF (0Ah) |
|---|---|---|---|---|---|

FIG. 37
LPR ACCESS ACCEPTANCE COMMAND

| COMMAND ID (LPR) | 03h | DATA FILE LENGTH | SP (20h) | ACCESS ACCEPTANCE/ REFUSAL ID | SP (20h) | URL NAME | LF (0Ah) |
|---|---|---|---|---|---|---|---|

FIG. 38
LPR PRINT ACCEPTANCE COMMAND

| COMMAND ID (LPR) | 03h | DATA FILE LENGTH | SP (20h) | PRINT ACCEPTANCE/ REFUSAL ID | SP (20h) | URL NAME | LF (0Ah) |
|---|---|---|---|---|---|---|---|

IMAGE PROCESSING APPARATUS AND METHOD, AND STORAGE MEDIUM THEREFOR

BACKGROUND OF THE INVENTION

1. Field of the Invention

The present invention relates to an image processing apparatus having an included function for accessing a World Wide Web server (hereinafter referred to as a WWW server), for example, on a network. More specifically, the present invention pertains to an image processing apparatus that accesses a server to acquire data for the generation of desired information, and for enabling the performance of an output process, such as printing.

2. Related Background Art

Recently, it has been possible for a computer, on which is mounted a special software program (hereinafter referred to as a browser) for accessing a server across a network, to use HTTP (Hypertext Transfer Protocol) to connect to a WWW server, whereat various types of data are-stored, and to refer to the data that is held by the WWW server. It is therefore possible for a plurality of computers to refer to and to share data available at a specific WWW server.

Furthermore, since a WWW browser makes it possible for a computer to store data at a WWW server, a user can transmit an instruction to print stored data to an information processor that has a printing function, and can thereby print data on the WWW server.

Further, the function for the accessing of a WWW server is also provided for an information processor that has a printing function, so that the information processor can directly access the WWW server to obtain data, and can then print the data. In this case, the printing instruction can be entered at a terminal connected to the server via the network, or at the operating panel of the specific information processor.

The instruction may include a specified time at which the information processor is to access the WWW server, and a time interval for the performance of periodical and repetitive accesses.

When an access time and an access time interval are designated, these designated timings are assigned to and stored with jobs at the information processor. A job for which an access time has been designated is stored until the access time is reached, and a job for which an access time interval has been designated is stored for an extended period of time in the information processor.

However, in an environment wherein the above described information processor is employed in common by a plurality of users, the number of jobs registered in the information processor is increased, and accordingly, the number of jobs to be stored is considerably increased as time elapses. Therefore, the memory capacity available for storing jobs is insufficient, and jobs that are to be processed at the same time tend to overlap and the processing capability to be degraded.

SUMMARY OF THE INVENTION

It is, therefore, a first objective of the present invention to provide an image processing apparatus that limits the functions that can be used by individual users, and reduces the number of jobs stored in the apparatus, so that the memory capacity available for storing jobs need not be increased and the processing capability can be improved.

It is a second objective of the present invention to provide an image processing apparatus and method whereby the period of time before the memory capacity becomes insufficient and the period of the time before the processing capability becomes degraded can be extended so they are longer than the conventional periods, and a recording medium therefor.

To access data on a WWW server, since the manner in which link information in HTML data is traced differs from the manner in which data are traced that are located at a URL (Uniform Resource Locator) site that is directly designated by a user, in addition to the URL site that is directly designated the user, other, linked URL sites are automatically searched. Therefore, data the user does not intend to access may be acquired at a linked URL site and printed, or a large amount of data that the user does not expect may be printed.

To resolve this problem, it is a third objective of the present invention to obtain and print only that data at a WWW server that is desired.

To achieve the first objective, according to the present invention an image processing apparatus, which is connected to a server on a network, comprises:

data acquisition means for accessing the server to obtain data;

data generation means for generating image data using the data obtained by the data acquisition means;

output means for outputting the image data that are generated by the data generation means;

first storage means for storing operating instruction information concerning an operating instruction for the image processing apparatus;

second storage means for storing operating restriction information concerning an operating restriction imposed on the image processing apparatus;

determination means for employing the operating restriction information stored in the second storage means to determine whether an operation to be performed by the image processing apparatus is permitted; and operation control means for, when the determination means ascertains that the operation to be performed by the image processing apparatus is permitted, executing the operation in accordance with an operating instruction that is included in the operating instruction information.

To achieve the second objective, according to the present invention an image processing apparatus comprises:

data acquisition means for accessing a server on a network in order to obtain image forming data from the server;

image forming means for processing the image forming data that are obtained;

identification data input means for entering identification data;

storage means for storing reference data that is to be compared with the identification data;

identification means for comparing with the reference data stored in the storage means the identification data entered by the identification data input means in order to identify the identification data; and control means for employing the result of the identification process to permit or to prohibit image forming by the image forming means.

To achieve the third objective, according to the present invention an image processing apparatus, which accesses HTML (HyperText Markup Language) data on a WWW (World Wide Web) server in accordance with designated address information and which prints the HTML data, comprises:

acceptance requesting means for requesting of a source that specifies the address information an acceptance for the accessing of data other than those data that correspond to the designated address information and that are linked with the pertinent data; and halting means for, when the acceptance requested by the acceptance request means can not be obtained from the source that specifies the address information, halting access of the data other than data that correspond to the designated address information and that are linked with the pertinent data.

BRIEF DESCRIPTION OF THE DRAWINGS

FIG. 5 is comprised of FIGS. 5A and 5B showing a diagram for explaining a list of items that can be instructed by a client;

FIG. 12 is a diagram for explaining an operating screen (monitor window) on the client terminal;

FIGS. 14A and 14B are diagram for explaining a sheet selection screen and a sorter selection screen in the operation section;

FIG. 16 is a diagram for explaining a print time designation screen in the operation section;

FIG. 18 is a diagram for explaining a time designation list screen in the operation section;

FIG. 20 is a diagram for explaining a log list screen in the operation section;

FIG. 21 is a diagram for explaining a user name selection screen in the operation section;

FIG. 22 is a diagram for explaining a manager password input screen in the operation section;

FIG. 23 is a diagram for explaining a user registration screen in the operation section;

FIG. 29 is a diagram showing an example data file;

FIG. 30 is a diagram showing an example control file;

FIGS. 31A, 31B and 31C are diagrams for explaining formats for various command packets;

FIG. 32 is a diagram showing an operating screen (monitor window) on the client terminal;

FIG. 36 is a diagram showing the contents of an acceptance request message;

FIG. 37 is a diagram showing the contents of an LPR access acceptance command;

FIG. 38 is a diagram showing the contents of an LPR print acceptance command.

DETAILED DESCRIPTION OF THE PREFERRED EMBODIMENT

The present invention will now be described while referring to the accompanying drawings.

System Configuration

Figure 1:
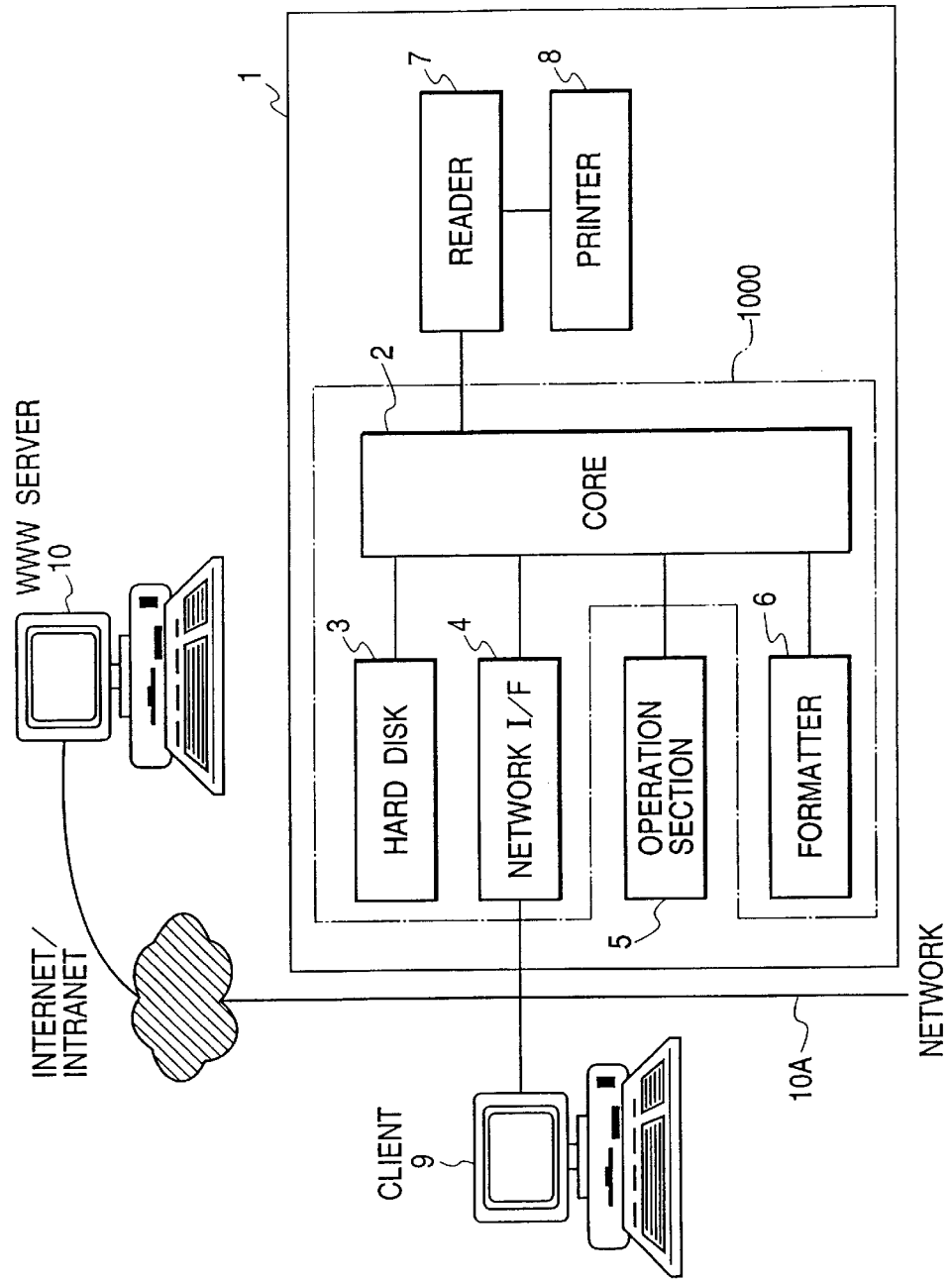
FIG. 1 is a block diagram illustrating the system configuration of an image processing apparatus according to one embodiment of the present invention.

FIG. 1 is a diagram showing the arrangement of an image forming system according to the present invention.

A digital copier 1 occupies the primary role in this system.

The digital copier 1 comprises: a hard disk 3, on which is stored image data, various programs, and reference information, such as passwords: a network interface 4, for communicating with an external device via a network 10a; an operation section 5, for instructing an operation to be performed by the digital copier 1; a formatter 6, for converting print data, which are received from an external device via the network 10a, into a format that the digital copier 1 can print; a digital image reader (hereinafter referred to as a reader); a digital image printer (hereinafter referred to as a printer) 8, which is located under the reader 7 and which prints digital images; and a core 2, for permitting all of these components to interact with each other.

A client terminal 9 for issuing an operation instruction to the digital copier 1 and a WWW (World Wide Web) server 10 are connected to the network 10a.

Figure 2:
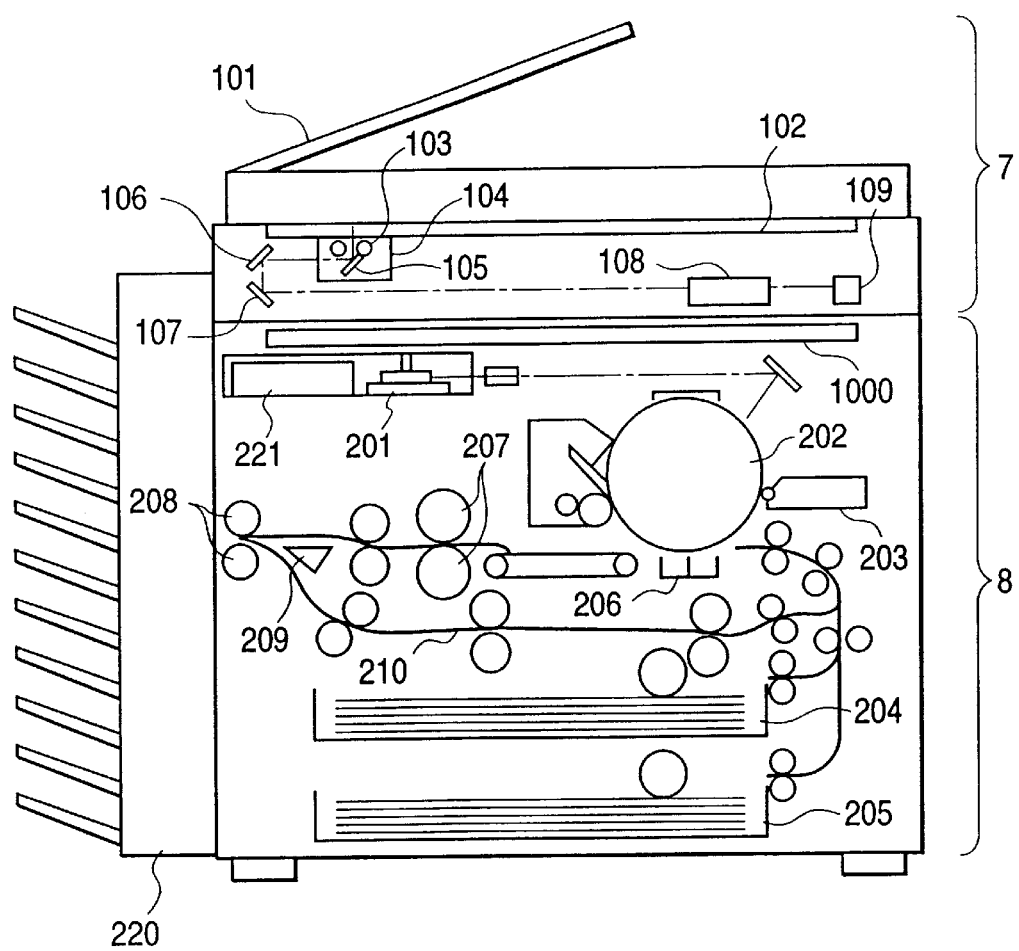
FIG. 2 is a cross-sectional view of the arrangement of a copier that is applied to the system in FIG. 1.

FIG. 2 is a diagram showing the structure of the reader 7 and the printer 8.

A document feeder 101 in the reader 7 feeds a document to be read, sheet by sheet, beginning with the last sheet, onto a platen glass 102, and discharges each sheet from the platen glass 102 after the reading has been completed. When a document is fed to the platen glass 102, a lamp 103 is turned on, and a reader unit 104 begins to move and scans the document.

The light reflected from the document is guided to a CCD image sensor (hereinafter referred to as a CCD) 109 via mirrors 105, 106 and 107, and a lens 108. The image of the document that is thus scanned is read by the CCD 109. A predetermined process is performed for the image data output by the CCD 109, and the resultant image data are transmitted to the printer 8 and to the core 2.

A laser driver 221 in the printer 8 drives a laser beam emitter 201 which emits a laser beam that corresponds to the image data output by the reader 7. A photosensitive drum 202 is irradiated by this laser beam, and a latent image that corresponds to the laser beam is formed on the drum 202. A developing agent is then attached by a developer 203 to that portion of the photosensitive drum 202 whereon the latent image is formed.

At a timing that is synchronized with the beginning of the laser beam irradiation process, a recording sheet is supplied from either a cassette 204 or 205 and is transported to a transfer unit 206 for the transfer, to the recording sheet, of the developing agent that is attached to the photosensitive drum 202. Thereafter, the recording sheet to which the developing agent has been transferred is delivered to a fixing unit 207, and the developing agent is thermally pressed and fixed to the recording sheet by the fixing unit 207. The recording sheet is then passed through the fixing unit 207 and is discharged by discharge rollers 208. Finally, a sorter 220 sorts the thus discharged recording sheets and stores them in individual bins. It should be noted, however, that when the sorting process is not set for the sorter 220, the recording sheets are stored in the topmost bin.

When the unit is set up to perform double-sided printing, upon a recording sheet being fed to the discharge rollers 28, the rotational direction of the discharge rollers 28 is reversed, and the recording sheet is guided to a paper feedback path by a flapper 209. And when the unit is set up to perform multiplex printing, before a recording sheet reaches the discharge rollers 208 it is guided to the paper feedback path by the flapper 209. Once in the paper feedback path, the recording sheet is again delivered to the transfer unit 206 at the above described timing.

Figure 3:
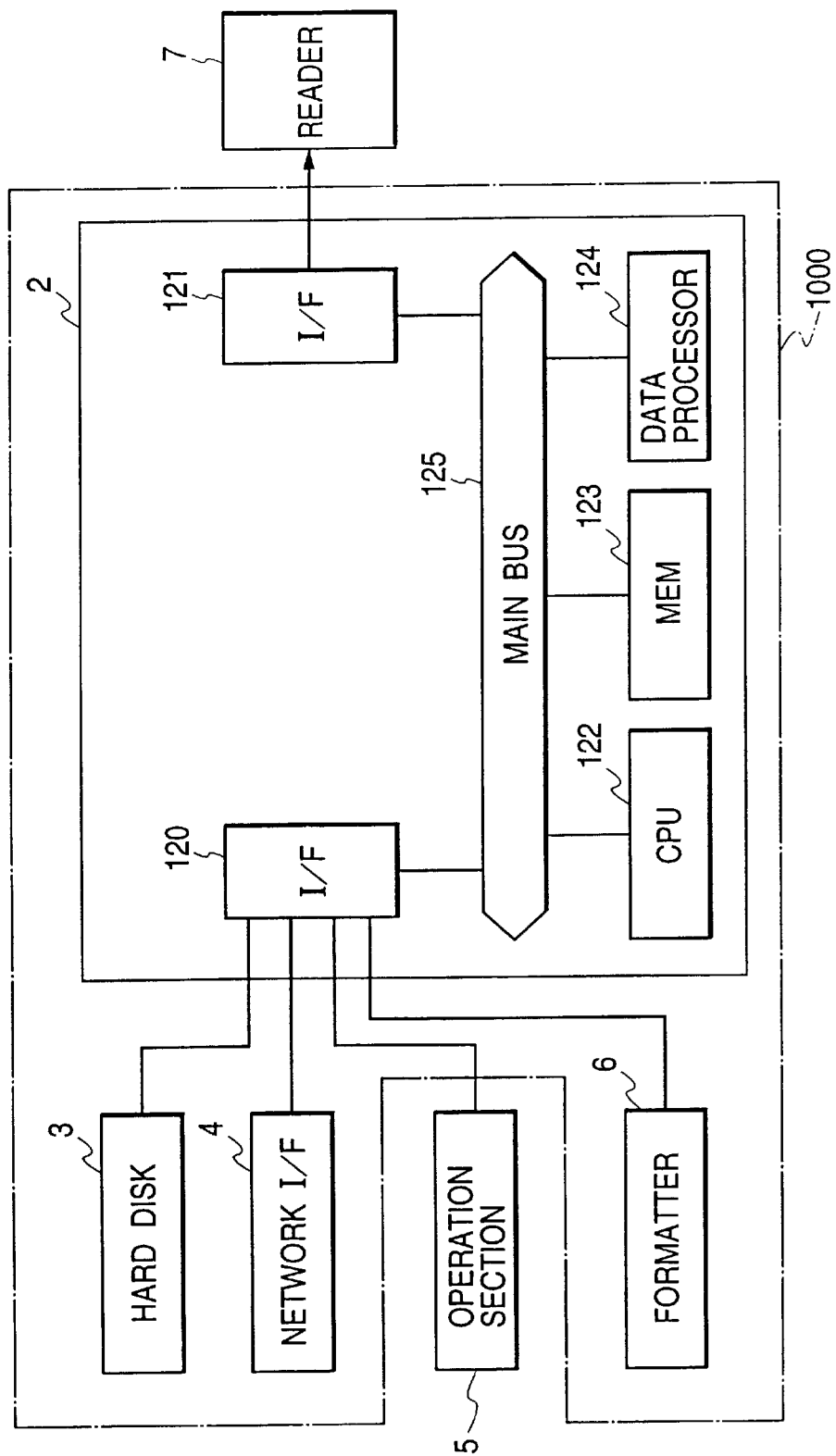
FIG. 3 is a block diagram illustrating the arrangement of a core unit in the system in FIG. 1.

FIG. 3 is a diagram showing the arrangement of the core 2 in a system controller 1000.

The core 2 is connected via a digital interface (I/F) 12 to the reader 7, and is also connected via a bus to the hard disk 3, the network interface (I/F) 4, the operation section 5, and the formatter 6.

Image data read by the reader 7 are transmitted via the I/F 121 to a data processor 124, and a control command from the reader 7 is transmitted to a CPU 122.

The data processor 124 performs image processing, such as the rotation of an image and the magnification of an image. Upon receiving the image data from the reader 7, the data processor 124 transmits these data via the digital interface (I/F) 120 to the hard disk 3 and the network interface 4, in accordance with a control command that is received at the same time as is the image data.

When a print request command is received from the external client terminal 9 via the network interface 4, the CPU 122 transmits to the formatter 6 PDL (Page Description Language) the data that are received at the same time.

The PDL data are developed into image data by the formatter 6, and the image data are transmitted to the data processor 124 and then to the printer 8, whereat they are printed.

The CPU 122 exercises the above described control in accordance with a control program stored in a memory 123 or with a control command received from the reader 7.

The memory 123 is used as storage space for the control program and is also used as a work area for the CPU 122. The control program includes a control program according to the present invention (see the flowcharts in FIGS. 26 to 28, which will be described later). The control program may be stored separately on a floppy disk, etc.

The core 2 can control the transmission of data among the reader 7, the hard disk 3, the network interface 4 and the formatter 6, and can perform a compound process, such as the reading of a document, the printing of an image and the exchanging of data with a computer.

Figure 4:
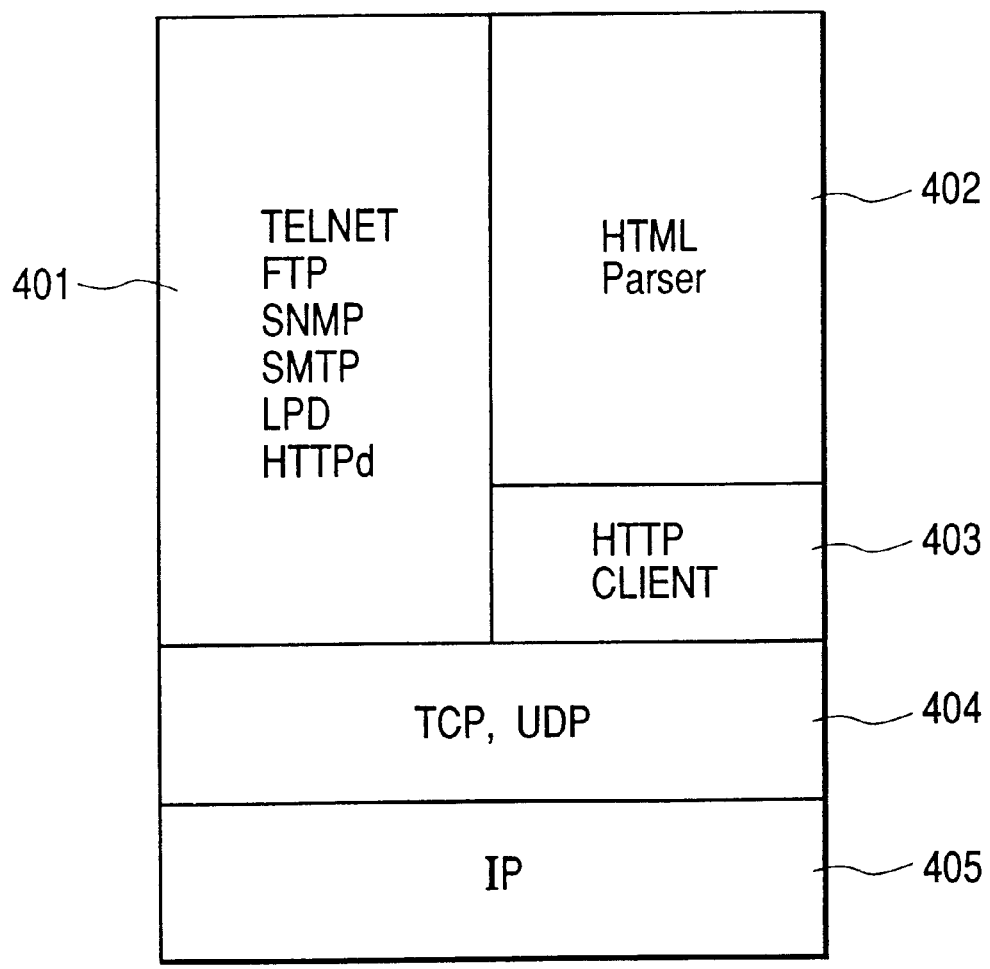
FIG. 4 is a diagram for explaining the software configuration for a network interface.

FIG. 4 is a diagram showing the program structure for the network interface 4.

An IP (Internet Protocol) 405 is an Internet protocol class for providing a service whereby a transmission host forwards a message to a destination host while interacting with a relay node, such as a router.

The most important data that must be included when sending a message are the IP addresses of the sender and the receiver. The routing that is to be used for the transmission to a destination host of a message forwarded across the Internet is determined by the IP class in accordance with the address information.

A TCP (Transmission Control Protocol), UDP (User Datagram Protocol) 404 is a transportation class that provides a service whereby a message is sent from a transmission application process to a reception application process.

The TCP, which is a connection service, ensures high reliability for communication, whereas the UDP, which is a connection-less service, does not ensure reliability.

An application class protocol 401 includes TELNET, which is a remote log-in service; FTP, which is a file transfer service; SNMP, which is a network management protocol; LPD (Line Printer Daemon), which is a printing server protocol; and HTTP, which is a protocol for a WWW (World Wide Web) server.

The application further incudes an HTTP client 403, which obtains data for the WWW server; and an HTMP Parser 402, which converts the obtained HTML data and image data into a data format that can be printed on a sheet.

In this embodiment, the function whereby the digital copier 1 actively accesses the WWW server 10 to obtain HTML data, and employs the data for printing using the printer 8 is called a "Web Pull Print" function.

Two methods are available whereby a user can request that the digital copier 1 perform the Web Pull Print function.

The first method employs a special program (hereinafter referred to as a print utility) that is operated by the external client 9. The second method employs the operation section 5 of the digital copier 1. These two methods will now be described in detail.

1. Method for Operating a Print Utility

The method used for operating a print utility is as follows.

A user can employ the print utility to prepare one of a variety of setups for using the Web Pull Print function, and can transmit the setup particulars to the digital copier in a packet that will be described later.

Upon receiving such a packet, the digital copier 1 analyzes the contents of the packet and initiates a Web Pull Print operation that corresponds to the included conditions.

The digital copier 1 also has a job spooling function for managing a plurality of Web Pull Print requests that are received from print utilities.

The print utility communicates with the digital copier 1 by using a packet that will be described later, so that information can be obtained concerning a job that is being internally spooled or so that a specific job can be deleted.

FIG. 5 is a diagram showing a list of items A that a user can set by using the print utility.

The individual items (see FIGS. 6 to 10) included in the list are as follows.

(1) Document Title

"Document title" 501 is the one printed at the head of the printed results. This item can be edited by a user.

(2) URL

"URL" 502 is used to specify the domain name of the WWW server at which a home page to be printed is stored, as well as the file name of HTML data that is to be obtained. That is, the URL 502 is information concerning the storage location of a file to be printed.

(3) Printer Address

"Printer address" 503 is the network address of a digital copier 1 that issues a Web Pull Print request.

(4) User Name/Password

For a "user name (/password)" 504, the name of a user registered in the digital copier 1 is entered. The digital copier 1 employs the user name to identify the sender of a Web Pull Print request, and examines the password to determine whether the Web Pull Print request should be accepted.

(5) Option File

"Option file" 505 is a file in which all the conditions set by the print utility are stored. An option file 505 is prepared for each user in advance and for this item a specific file is specified, so that all the items can be collectively set up.

(6) Link Level

When a hyperlink is set for a home page that is specified to be printed, the digital copier 1 can trace the link and can print the home page located at the linked destination. At this time, "link level" 506 is used to specify the depth to which the link should be traced.

(7) Maximum Print Pages

"Maximum print pages" 507 is the upper limit for the number of pages to be printed when a home page that is to be printed extends over a plurality of pages.

(8) Print Over Maximum Print Pages

"Print over maximum print pages" 508 is used to specify whether printing should be continued until the end of a home page is reached when the home page extends over multiple pages and the number of these pages exceeds the "maximum print pages" number entered in (7).

(9) Go to Other Site

"Go to other site" 509 is used to specify whether data at a link destination should be printed when a number of one or more is set for the "link level" in (6) and the link destination is another site.

(10) Print Link Map

The digital copier 1 in this embodiment can prepare/print a link map that represents a linked relationship when a home page is printed by tracing a link. "Print link map" 510 is used to determine whether the link map should be printed as the last page of the home page.

(11) Print Page No.

"Print page No." 511 is used to specify whether the page number should be printed at the foot of the printed results.

(12) Print Date

"Print date" 512 specifies whether a printing date should be printed at the foot of the printed results.

(13) Print URL

"Print URL" 513 specifies whether the URL should be printed at the foot of the printed results.

(14) Print Document Title

"Print document title" 514 specifies whether "document title" in (1) should be printed at the head of the printed results.

(15) Header

"Header" 515 is an arbitrary character string to be printed at the head of the printed results.

(16) Header Position

"Header position" 516 is a position whereat a character string selected as the "header" in (15) is to be printed.

(17) Print Background

"Print background" 517 specifies whether a background image should be printed when it is specified in a home page. When black is specified as a background color for the home page, although no problem will occur when the data are displayed on a color screen, both the text portion and the background portion will be printed in black by a monochrome printer, and the text can not be distinguished. By performing the "print background" 517 setup, such a problem can be prevented.

(18) Chapter No. for <H> tags

"Chapter No. for <H> tags" 518 specifies whether a chapter number should be added to the head of a chapter in a home page.

(19) Print Hyperlinked Document First

When links at two or more link levels are specified, "print hyperlinked document first" 519 is used to determine whether links are to be printed in the order in which they are read, or whether links at the same link level are to be printed first.

(20) Scale

"Scale" 520 is set to enlarge/reduce the size of a home page that is printed. Further, "scale" 520 can be used to instruct "N-up printing" for reducing the sizes of a plurality of pages and laying out these pages on a single sheet of paper.

(21) Scale Down at Page Boundary

When an image on a home page is extended to the page boundary, "scale down at page boundary" 521 is set for the digital copier 1 in this embodiment to reduce the size of an image so that it will fit on a page for printing.

(22) Font Name

"Font name" 522 is used to print HTML text data, and can be selected from the list of printer fonts.

(23) Font Size

"Font size" 523 is used to print a character string for a chapter in a home page.

(24) Font Weight

"Font weight" 524 is used to print a character string for a chapter in a home page.

(25) Use Style Sheet

"Use style sheet" 525 specifies whether a file named in "style sheet name" in (26) should be used.

(26) Style sheet name

"Style sheet name" 526 specifies the name of a file when there is a file (style sheet) in which the font name in (22), the font size in (23) and the font weight in (24) are stored. As a result, a user can perform a setup for the font, without setting the individual items.

(27) Paper Size

"Paper size" 527 is the size of paper used for printing.

(28) Orientation

"Orientation" 528 specifies either portrait or landscape as the paper printing direction.

(29) Margin

"Margin" 529 is the margin measured from the edge of the paper to be used for printing.

(30) Copies

"Copies" 530 is set to enable the printing of multiple copies.

(31) Sorter

"Sorter" 531 specifies the operating mode of the sorter 220 that is connected to the digital copier 1 in this embodiment. The operating mode includes normal sorting, stable sorting and group sorting.

When normal sorting is selected, multiple copies are prepared by discharging a complete set to each bin of the sorter 220.

When stable sorting is selected, after the sorting is completed, the copies are stapled.

When group sorting is selected, multiple copies of the same pages are discharged to the same bins.

(32) Resolution

"Resolution" 532 specifies the printing resolution.

(33) Duplex

"Duplex" 533 is used to specify double-sided printing.

(34) Enable Schedule

"Enable schedule" 534 is used for the digital copier 1 in this embodiment to initiate the Web Pull Print operation at a specific time, and to periodically repeat a Web Pull Print request received from a user. These functions are called scheduling.

Specifically, there are an immediate execution mode, a time designation mode, and a periodically cyclic mode (specify the day of a week, a date or a time interval). "Enable schedule" specifies one of these modes.

(35) Day

"Day" 535 specifies the day of a week for execution when the periodically cyclic mode (specification of the day of a week) is entered in "enable schedule" in (34).

(36) Date

"Date" 536 specifies a date for execution when the time designation mode or the periodically cyclic mode (specification of a date or a time interval) is selected in "enable schedule" in (34).

(37) Time

"Time" 537 specifies a date for execution when the time designation mode or the periodically cyclic mode (specification of a date or a time interval) is selected in "enable schedule" in (34).

(38) Cycle

"Cycle" 538 specifies a time interval for execution using a day and time when the periodically cyclic mode (specification of a time interval) is selected.

(39) Print updated document only

"Print updated document only" 539 specifies whether only a home page that is updated after a previous printing should be printed in the periodically cyclic mode. The image processing apparatus determines whether the file name of the home page has been changed or examines the information for an update date using a certain property, so that whether the home page has been updated can be determined.

FIGS. 6 to 12 are diagrams, each of which show a print utility operating screen in the client terminal 9.

Figure 6:
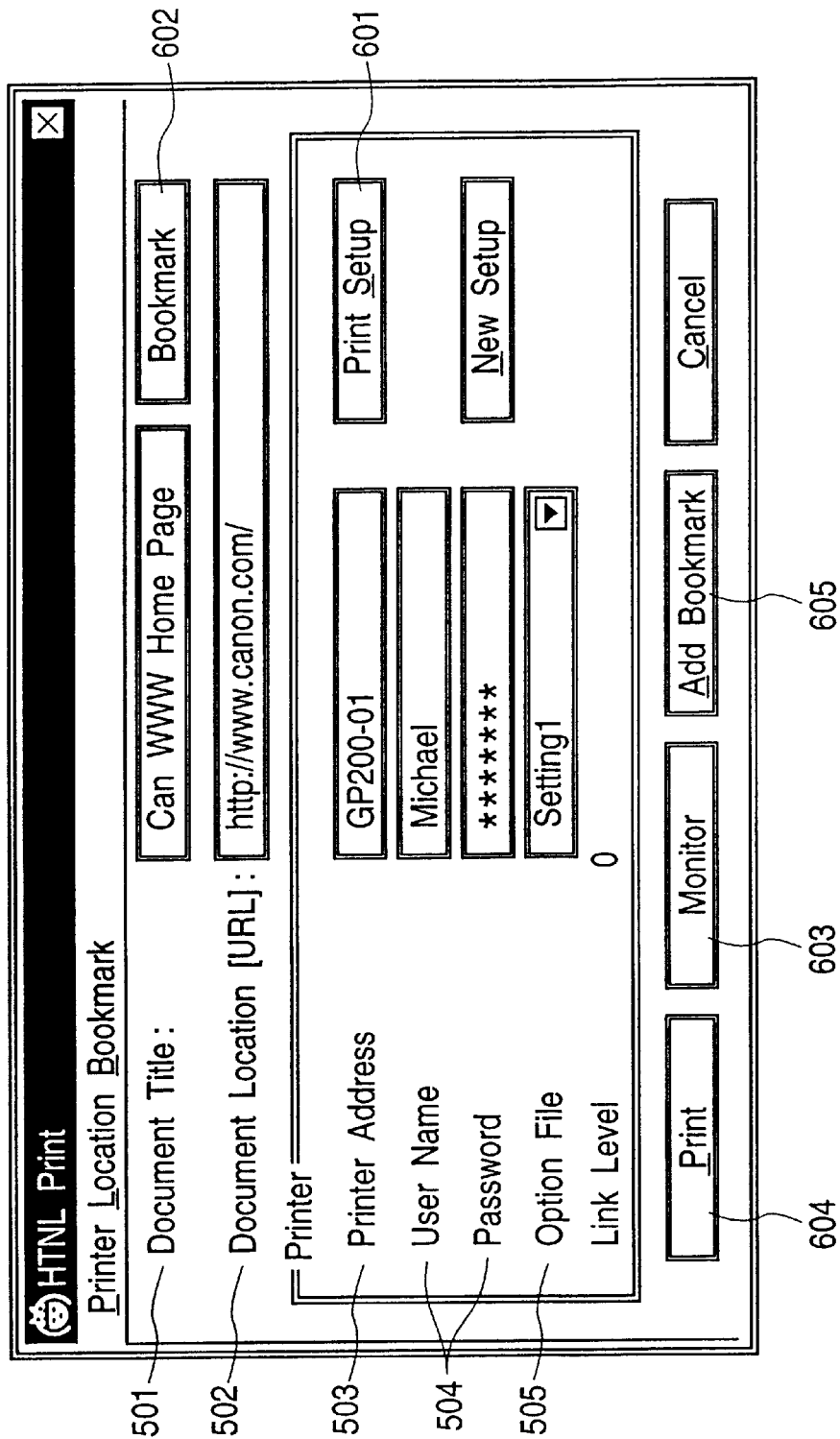
FIG. 6 is a diagram for explaining an operating screen (top window) on a client terminal.

When the print utility is activated by the client terminal 9, first the operating screen in FIG. 6 is displayed to set the items (1) to (5). The user name and the password that are entered must be ones that were registered in the digital copier 1 in advance.

As will be described later, when the digital copier 1 receives a Web Pull Print request from the print utility, it compares the received user name and the password with those that have been registered in advance. When a matching user name and password can not be found, the digital copier 1 does not accept the request.

Figure 7:
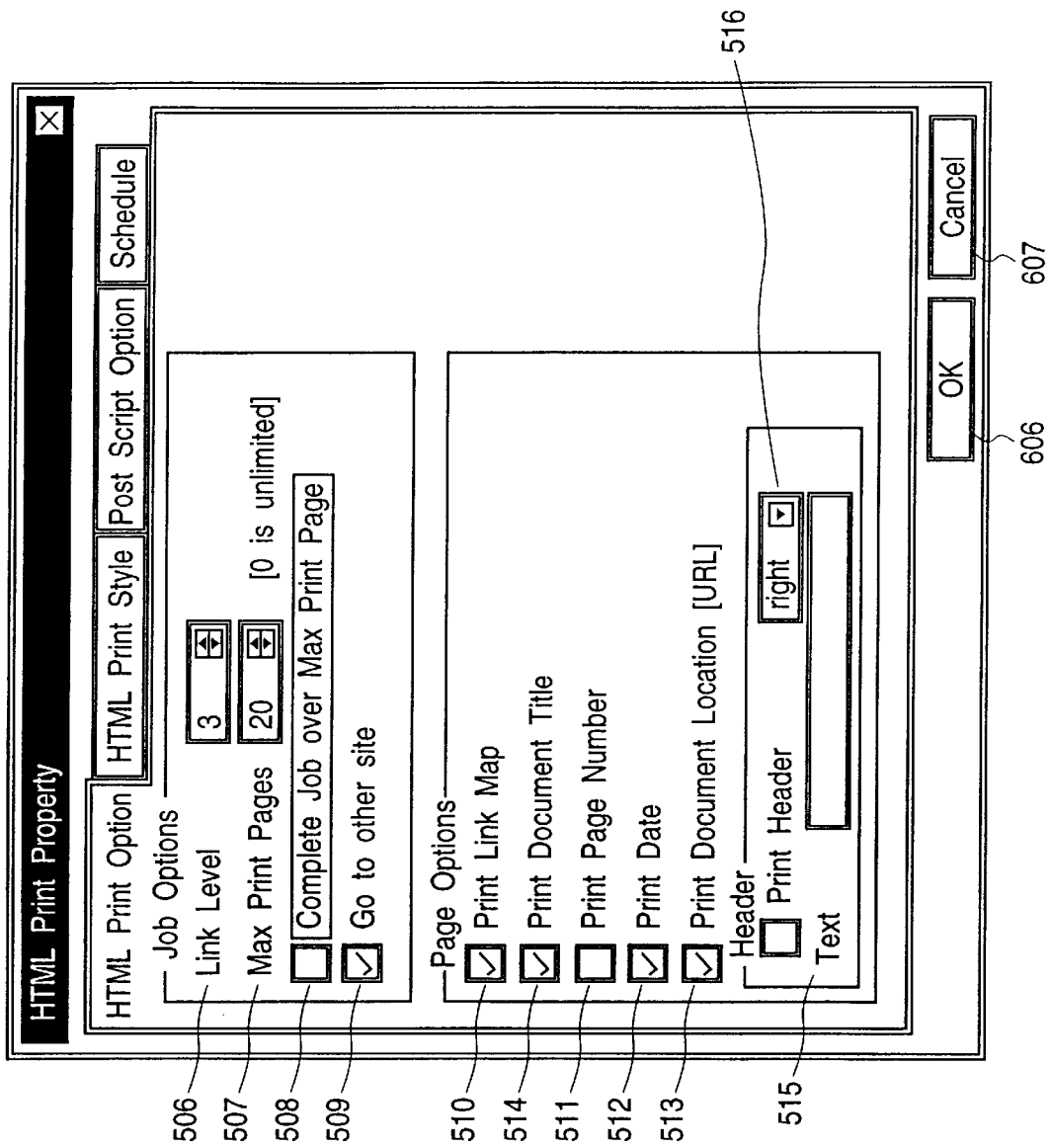
FIG. 7 is a diagram for explaining an operating screen (HTML print option window) on the client terminal.

To set the items (6) to (38), the operating screen in FIG. 7 is called by depressing a "Print Setup" button 601 on the operating screen in FIG. 6.

Figure 8:
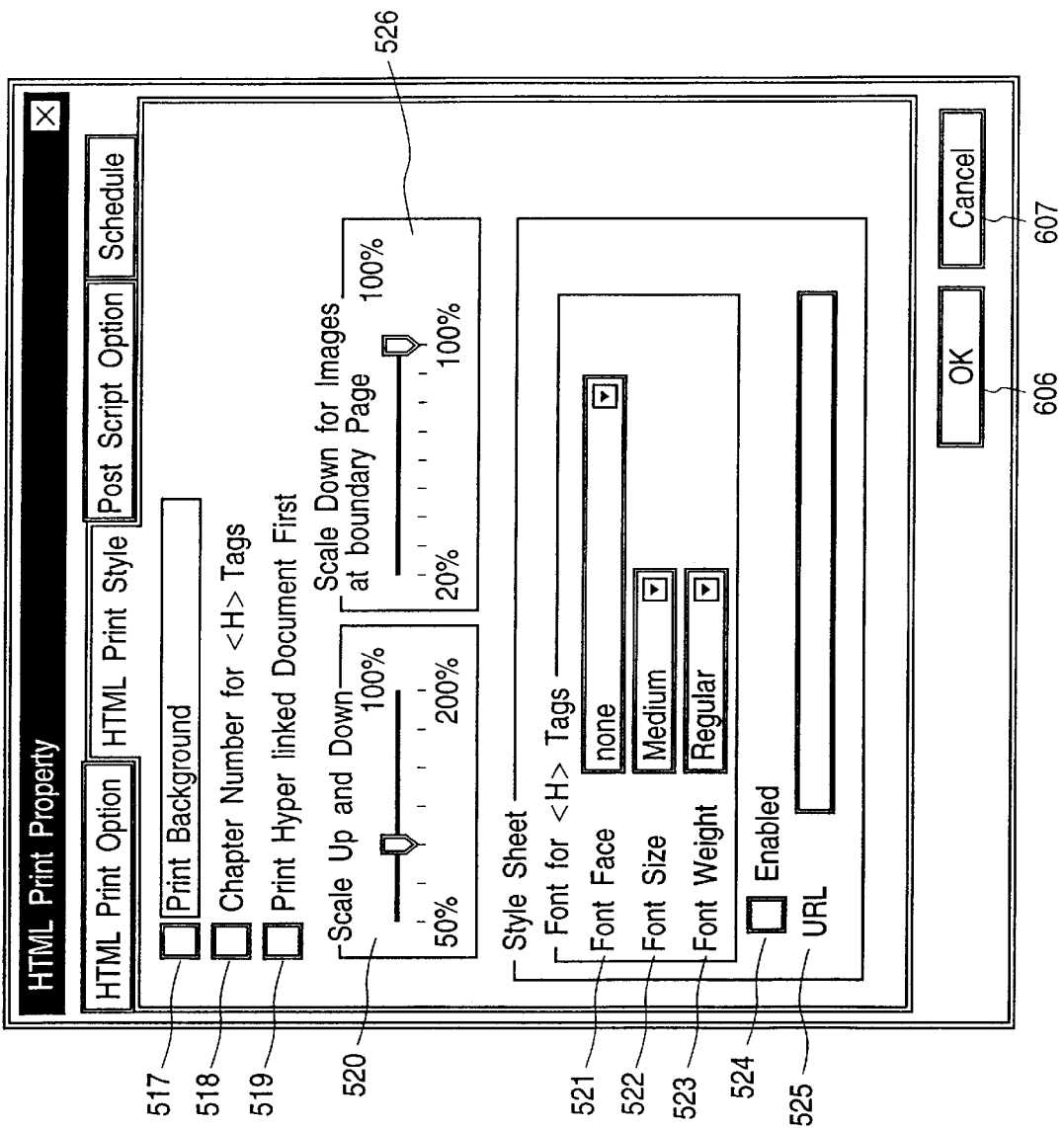
FIG. 8 is a diagram for explaining an operating screen (HTML print style window) on the client terminal.
Figure 9:
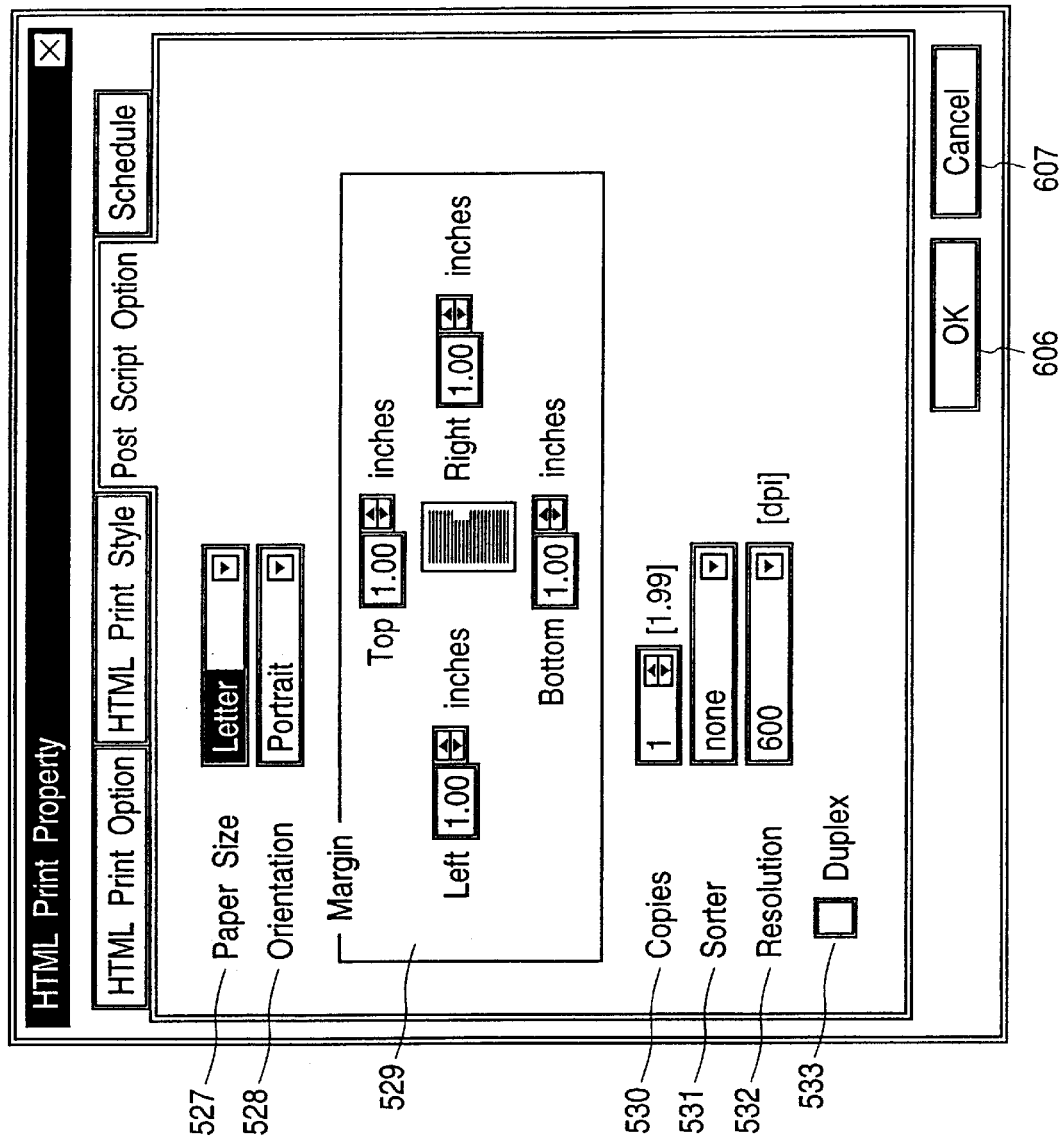
FIG. 9 is a diagram for explaining an operating screen (postscript option window) on the client terminal.
Figure 10:
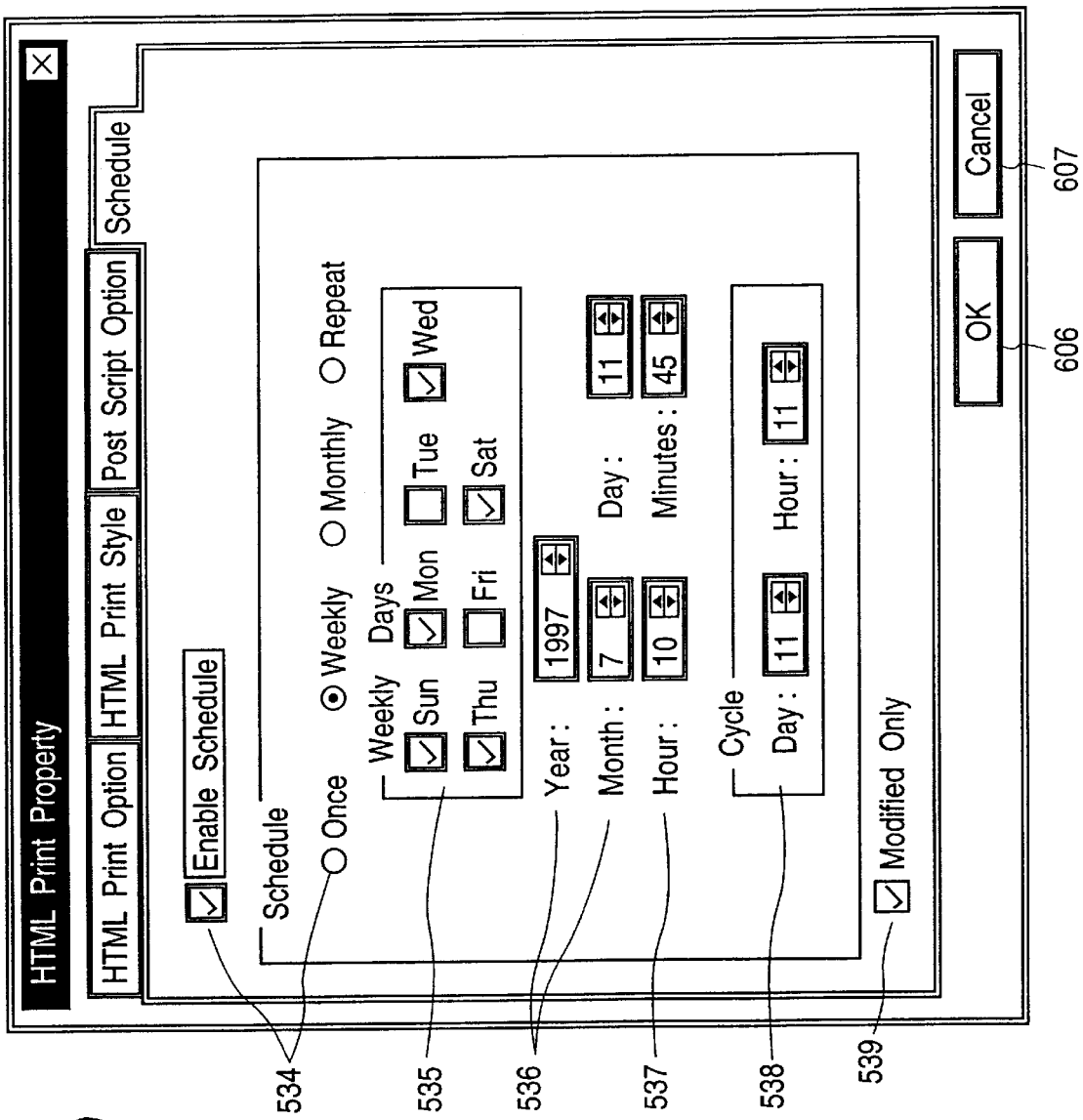
FIG. 10 is a diagram for explaining an operating screen (schedule window) on the client terminal.

Further, when a tag at the upper portion of the operating screen in FIG. 7 is pressed, the operating screen is shifted to one of those in FIGS. 8 to 10. In addition, when an "OK" button 606 or a "Cancel" button 607 is pressed on the operating screen in FIGS. 8 to 10, the operating screen is returned to that in FIG. 6.

Figure 11:
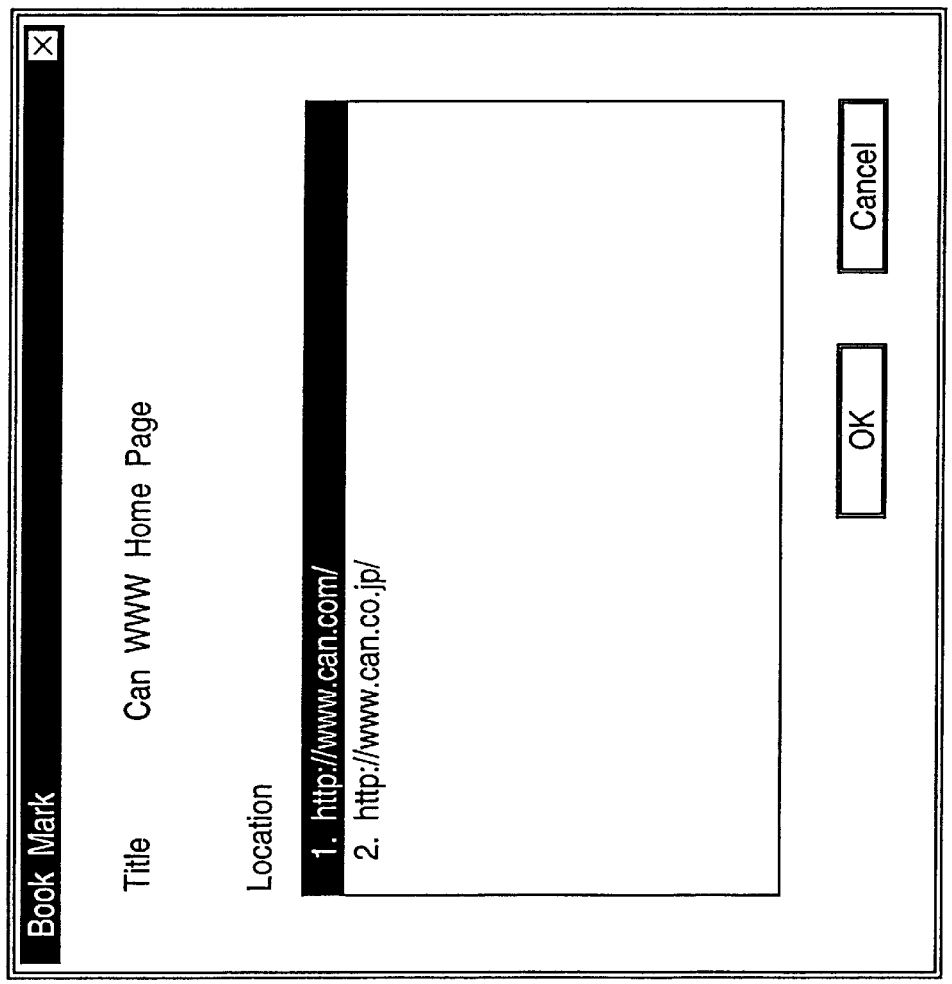
FIG. 11 is a diagram for explaining an operating screen (bookmark window) on the client terminal.

In addition, a bookmark screen in FIG. 11 is displayed by pressing a "Bookmark" button 602 on the upper right of the operating screen in FIG. 6.

A bookmark is a list of the URLs and the titles of home pages. When there is a bookmark that has already been registered, the contents of a list are displayed on the screen. To select a URL from the list, a desired URL is selected and displayed in reverse video and the OK button 606 is pressed. Then, the title and the URL that are selected are displayed in boxes 501 and 502 on the operating screen in FIG. 6. To add a new title and a new URL, they are entered in the boxes for the items 501 and 502 in FIG. 6, and an "Add Bookmark" button 605 is pressed. The new title and the new URL are then added to the above list.

A setup method shown on the operating screen in FIG. 10 will now be described in detail.

To set a schedule, first, a user examines the "Enable Schedule" box 534. At the initial setup, the check box is not examined, and in this situation, the setup of the schedule is inhibited.

When the check box 534 is examined, the setup of the individual items 534 to 539 is enabled. The user can then select one of the modes "Once", "Weekly", "Monthly", and "Repeat."

When the "Once" mode is selected, only the setup of the items 536 and 537 is enabled, and the user then enters the execution start time (year/month/day/hour/minute) for the Web Pull Print function. With this specification, the digital copier 1 performs the Web Pull Print operation one time on the date and and the time that are specified.

When the "Weekly" mode is selected, the setup of the items 535 and 537 is enabled, and the user then enters the execution day and time (hour/minute) for the Web Pull Print operation. It should be noted that a plurality of days can be designated. With this specification, the digital copier 1 repeats the Web Pull Print operation every week on the day and at the time that are specified.

When the "Monthly" mode is selected, the setup of the item "Day" 536 and the item 537 is enabled, and the user then enters the execution date and time (hour/minute) for the Web Pull Print operation. With this specification, the digital copier 1 repeats the Web Pull Print operation every month on the date and at the time that are specified.

When the "Repeat" mode is selected, the setup of the items 536, 537 and 538 is enabled, and the user then enters the execution date, the execution time (hour/minute), and the execution time interval (day/hour) for the Web Pull Print operation. Then, on the execution date the digital copier 1 initiates the performance of the Web Pull Print operation, and repeats it at regular intervals in accordance with the time period entered by the user.

When the "Weekly"/"Monthly"/"Repeat" mode is selected, the examination of the "Modified Only" check box 539 is enabled.

With the above method, the user can open the individual operating screens in FIGS. 6 to 10, and can set the necessary items.

When the user completes all the setups and depresses the "Print" button 604 on the operating screen in FIG. 6, the print utility transmits the setups to the digital copier 1.

Further, when the "Monitor" button 603 is depressed on the operating screen in FIG. 6, the operating screen in FIG. 12 is displayed. The print utility communicates with the digital copier 1, requests information concerning a job that is spooled in the digital copier, and displays the obtained information on the operating screen.

The user can ascertain the processing condition of the job that is being spooled by referring to the display contents.

The user can also delete a job that is being spooled. The user selects and inverts a job to be deleted using the job information that is displayed on the operating screen and that is registered by the user ("Owner" indicates the pertinent user), and depresses a "Delete" button 608. Then, the print utility transmits, to the digital copier 1, a deletion request that includes the job number of the selected job. Upon receiving the deletion request, the digital copier 1 deletes the spooled job for which the job number, the user name and the password match. When a job for which the "Owner" is not the pertinent user is selected and the "Delete" button 608 is pressed, the print utility determines whether the identity of "Owner" matches that in the client terminal 9. When the identity of "Owner" differs, transmission of the deletion request is inhibited.

This completes the explanation of the method of operation for the print utility.

2. Method for Operating the Operation Section

The method used for the operation of the operation section 5 will now be described.

Figure 13:
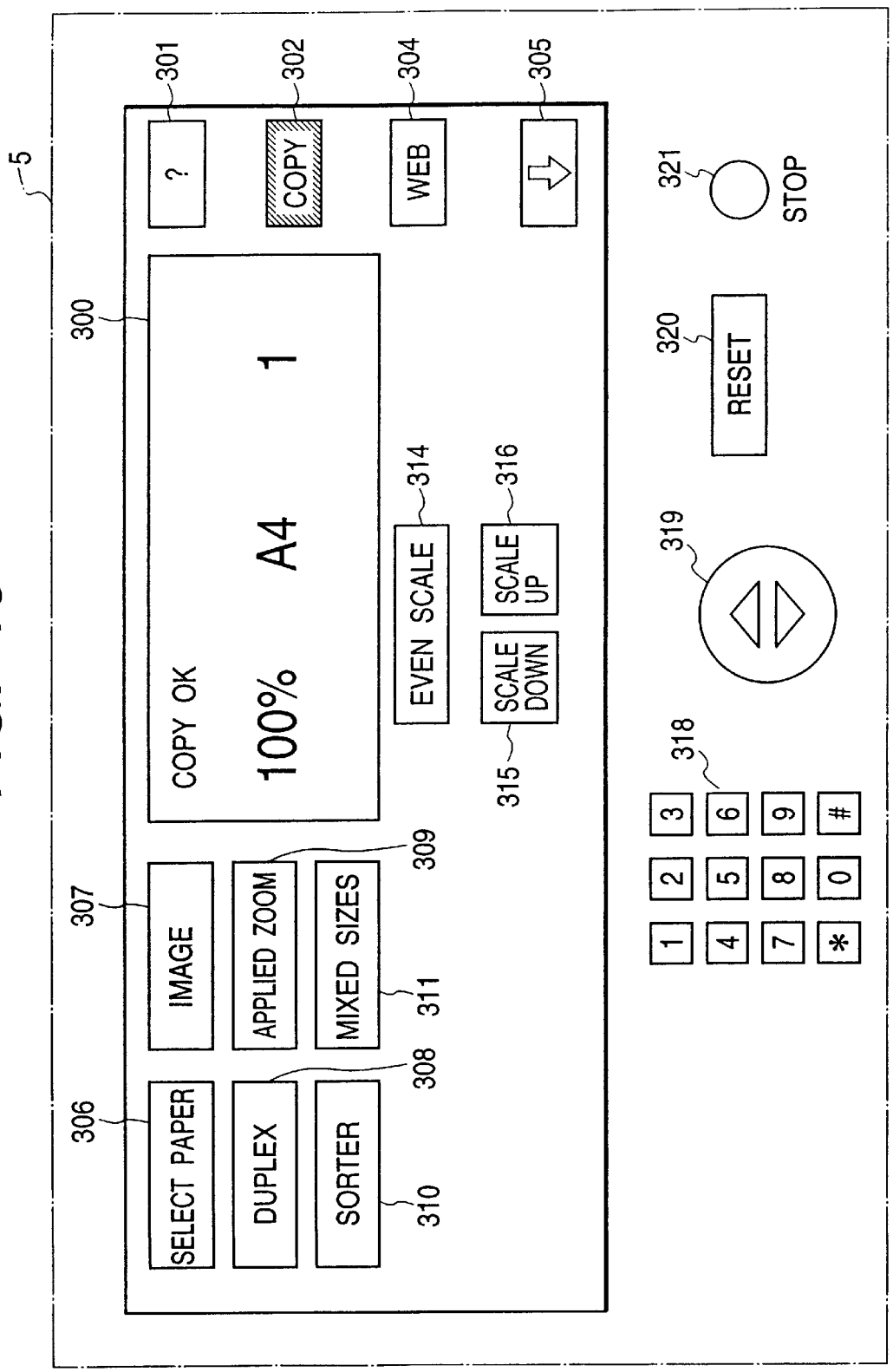
FIG. 13 is a front view of an operating section in a copy mode.

FIGS. 13 and 14 are diagrams showing the display of a copy mode for the operation section 5.

A display screen 300 is a window for representing the current state. The window 300 that is shown currently represents a state wherein copying is enabled, the A4 sheet size is selected, the scale is 100%, and one copy is to be printed.

A guide key 301 is used to display an adequate advice message when the operation is not familiar to a user.

Of the mode change keys 302 to 304, when the key 302 is depressed, the mode is changed to the copy mode. And when the key 304 is depressed, the mode is changed to the print mode.

A key 305 is used to display a mode key that can not be currently displayed. Upon the depression of this key 305, a printer mode key is displayed.

When a paper selection key 306 is depressed, a menu in FIGS. 14A and 14BA are displayed, and a user can select the paper size stored in the cassette 204 or 205.

An image processing key 307 is used to display a menu for the setup for image processing. With this key 307, trimming, masking, negative/positive inversion, and shadowing processes can be set.

A duplex key 308 is used for the three setups for duplex printing: single-side copying of a single-sided document, double-side copying of a single-sided document, and double-sided copying of a double-sided document.

An applied zoom key 309 is used to display a menu screen to facilitate the changing of the vertical and horizontal scales.

When a sorter key 310 is depressed, a menu concerning the sorter 220, as shown in FIG. 14B, is displayed.

When sorting is selected, when a plurality of copies are discharged they are sorted and distributed to the individual bins of the sorter 220. When staple sorting is selected, stapling of sorted copies is set. When group sorting is selected, multiple copies of the same page are discharged to the same bin.

A mixed sizes key 311 is used to determine whether documents of mixed sizes are mounted or whether a document of the same size is mounted. When the mixed sizes procedure is designated, each document page that is scanned is examined to determine its size. When the mixed sizes procedure is not designated, only the first document document page is examined.

An even scale key 314 is used to return the scale to 100%.

A scale down key 315 and a scale up key 316 are used to display a menu for setting the scale.

A ten key pad 318 is used to set the number of copies to be printed.

When a reset key 320 is depressed, parameters required for copying are returned to their default values. When these parameters that are required for copying have been set in advance, copying is initiated upon the depression of a start key 319.

When after the initiation of the copying a STOP key 321 or the reset key 320 is depressed, the copying is halted.

FIGS. 15 to 20 are diagrams showing the screens in the Web Pull Print mode that are displayed by depressing the Web Pull Print mode key 304.

Figure 15:
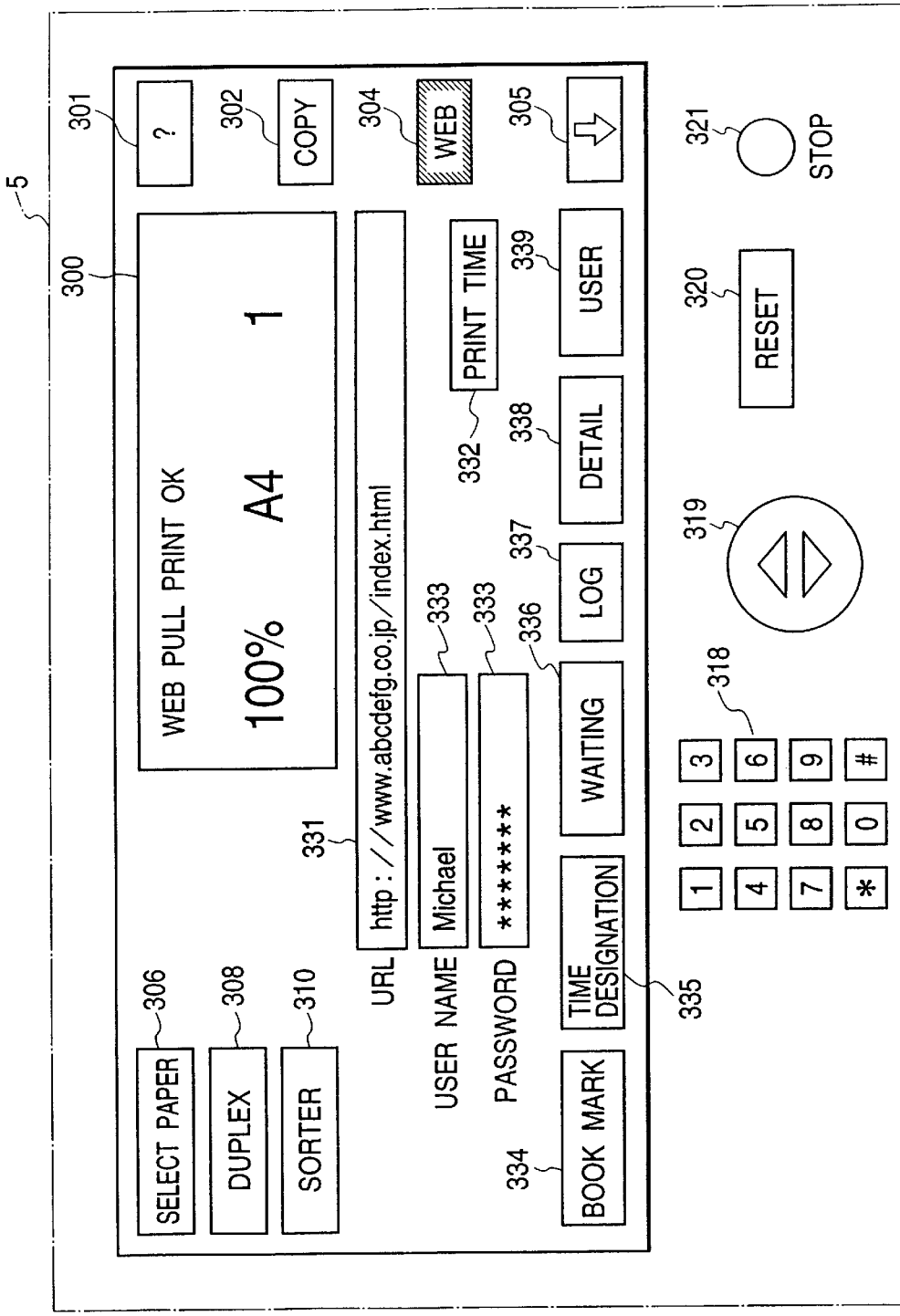
FIG. 15 is a front view of the operation section in the web pull print mode.

In the window 300 in FIG. 15 is shown the setup for the current mode, which comprises the Web Pull Print mode, the A4 paper size, the scale of 100%, and the printing of one copy.

The domain name of a WWW server to be accessed and the file name of the HTML data that are to be obtained are displayed in a URL key 331. When this key 331 is depressed, an alphabetic keyboard (not shown) is displayed for the entry of an arbitrary character string.

A print time key 332 is used to open a window (see FIG. 16) for setting the date and time at which the Web Pull Print operation is to be started. Since the parameters to be set in this window are the same as those in FIG. 10, no detailed explanation for them will be given.

The name of a user who employs the Web Pull Print mode and his or her password are displayed on a user name key and a password key 333.

When the user depresses the user name key 333, a window (see FIG. 21) is displayed on the screen showing a list of user names that have been registered in advance in the digital copier 1. When one of the user names is selected, it is reflected in the display at the user name key 333.

When the password key 333 is depressed, an alphabetic keyboard (not shown) is displayed for the entry of an arbitrary character string. The user employs this keyboard to enter a password that corresponds to the selected user name.

Figure 17:
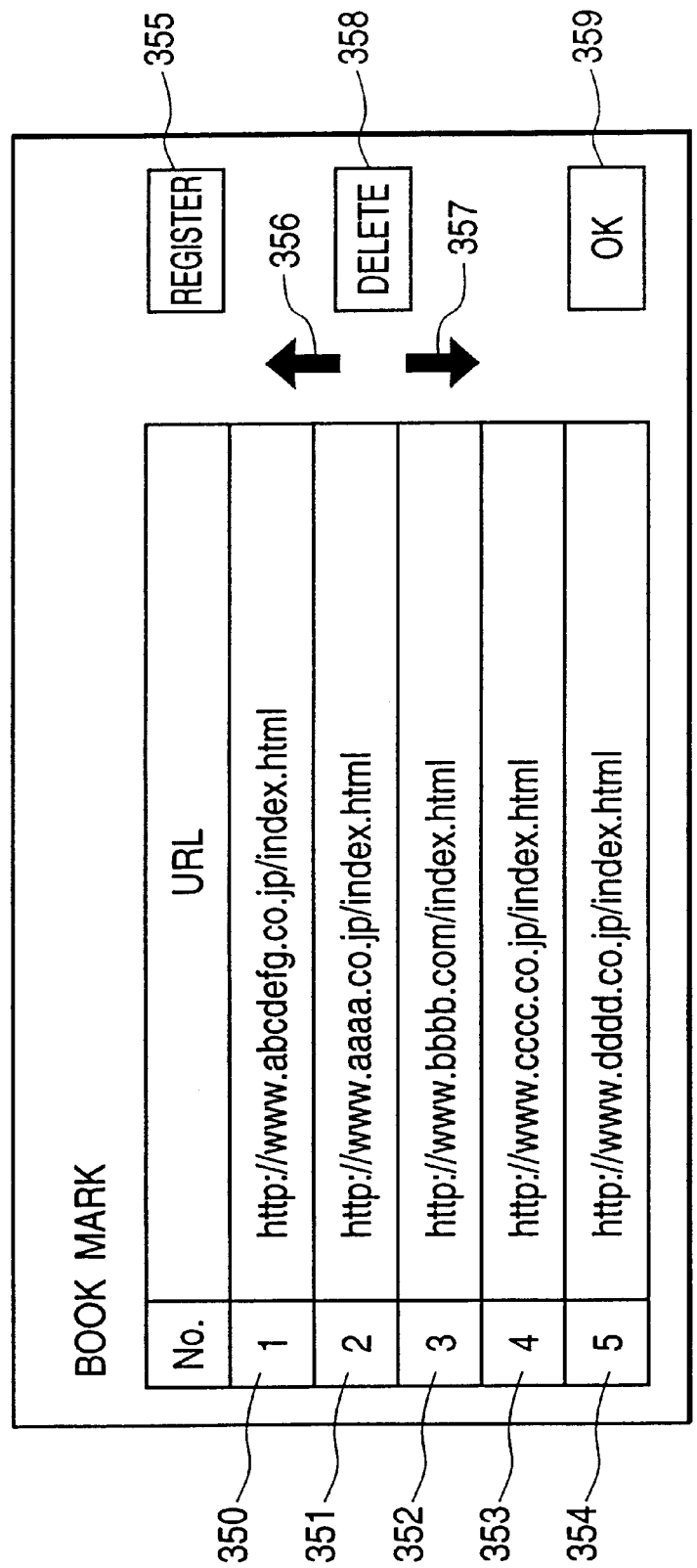
FIG. 17 is a diagram for explaining a bookmark screen in the operation section.

Upon the depression of a BOOKMARK key 334, a BOOKMARK window in FIG. 17 is displayed.

Upon the depression of a time designation list key 335, a time designation list window in FIG. 18 is displayed.

Figure 19:
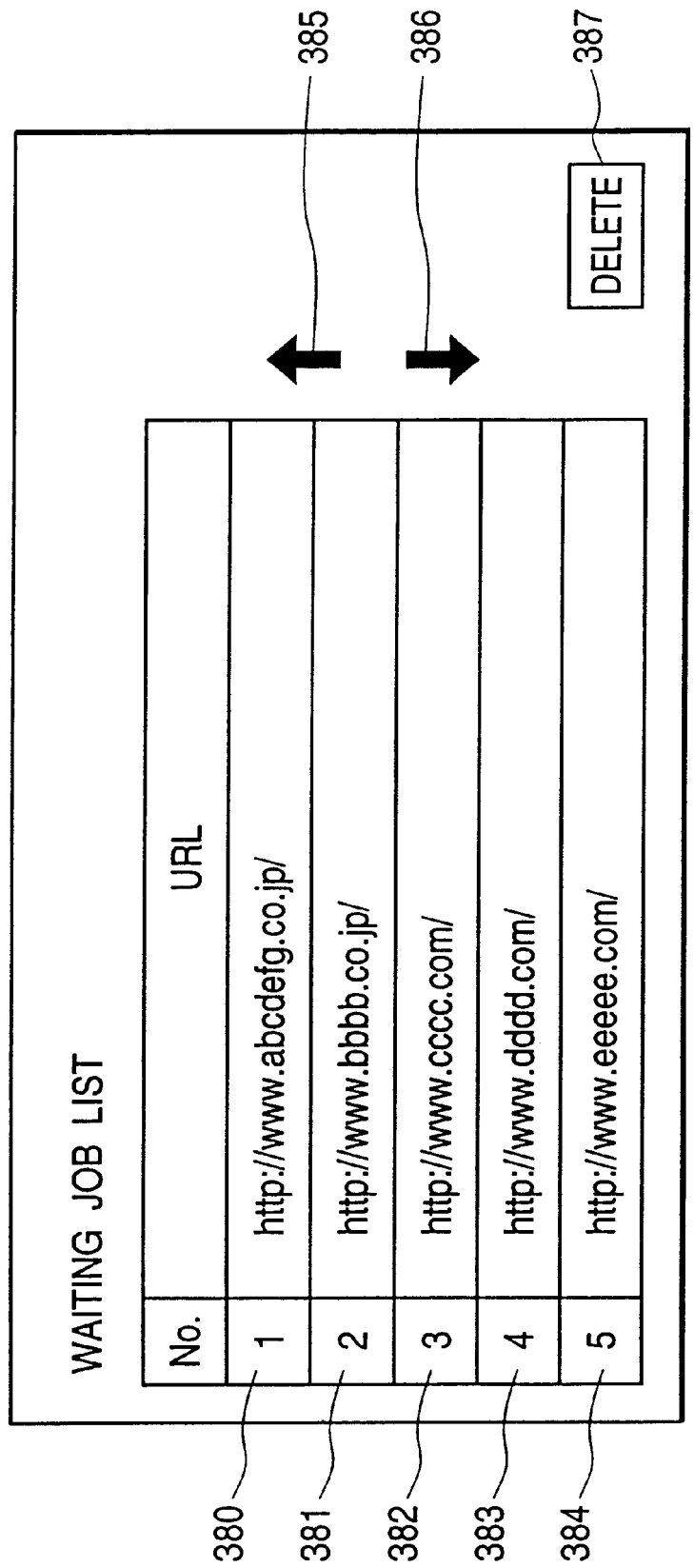
FIG. 19 is a diagram for explaining a waiting job list screen in the operation section.

Upon the depression of a waiting job list key 336, a waiting job list window in FIG. 19 is displayed.

Upon the depression of a log key 337, a log list window in FIG. 20 is displayed.

A detail key 338 is used to display a menu window to set detailed parameters concerning the Web Pull Print operation. The parameters in this window are set for all of the list items in FIGS. 5A and 5B, except for paper size, duplex printing, sorter, URL, enable schedule, day, date, time and cycle.

The list of URLs 350 to 354 that have already been registered are displayed in the BOOKMARK window in FIG. 17. When an up arrow key 356 is depressed, the URL list is scrolled upward. When a down arrow key 357 is depressed, the URL list is scrolled downward.

When a registration key 355 is depressed, a URL that is displayed at the URL key 331 in FIG. 15 is additionally registered on the list.

When one of the URLs 350 to 354 is selected and inverted, and an OK button 359 is depressed the selected URL is set at the URL key 331.

Similarly, when the URL is selected and inverted, and a delete key 358 is depressed the selected URL is deleted from the URL list.

A list of jobs for which the printing time is designated in the print time designation window (see FIG. 16) is displayed in the time designation list window in FIG. 18. The display contents are a URL 366, a print day 367, and a print time 368. The jobs on the list can be deleted in the same manner as was described while referring to FIG. 17.

In the waiting job list window in FIG. 19 is displayed a list of the jobs that are waiting while another job is being executed in the HTTP client processing (step S504), and the HTML parser processing (step S506), which will be described later. The jobs on the list can be deleted from the list in the same manner as was described while referring to FIG. 17.

The results obtained by the execution of jobs are displayed in the log list window in FIG. 20. The jobs are displayed in order, beginning with the job having the latest execution time. When the number of jobs exceeds the maximum display count, the jobs are automatically deleted beginning with the oldest one. The display contents are a URL 393, a date 394, a time 395, and a result 396.

The URL 393 is that of the WWW server that was accessed, and the date 394 and the time 395 are those effective when the WWW server was accessed.

"Normal" is entered in the result 396 column for the jobs 388, 391 and 392, for which the accessing of the WWW server and the printing were performed normally. "Reset" is entered in the result 396 column for job 389 for which the user halted the printing by using the reset key. And "Error" is entered in the result 396 column for a job 390 for which printing was not normally performed, either due to the state of the network or the state of the WWW server.

When the parameters required for the individual setup windows concerning the Web Pull Print operation have been set and the start button 319 in FIG. 15 is depressed, a Web Pull Print request command is issued by the operation section 5 and transmitted to the command reception process.

This completes the explanation of the method for operating the the operation section 5.

An explanation will now be given for a user registration method performed by using the operation section 5 of the digital copier 1.

Before a user employs the Web Pull Print function of this system, information concerning the user must be registered in advance in the digital copier 1. A specific manager who has a manager password performs this registration. The manager password is set by employing a user mode when the digital copier 1 is installed, and basically, the user who sets this password is defined as a manager.

To register a user, a manager first depresses the user registration button 339 in FIG. 15, and then, in a manager identification window in FIG. 22 that is subsequently displayed on the screen, enters his or her manager password. If the password that is entered is correct, a user registration window in FIG. 23 is displayed.

Figures 24, 25:
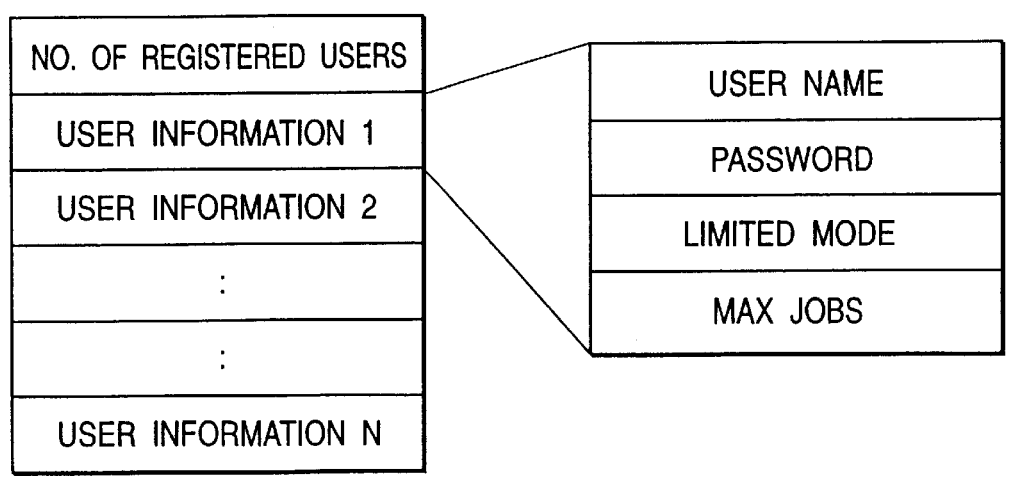
FIG. 24 is a diagram for explaining a user information screen in the operation section.
FIG. 25 is a diagram for explaining the structure of a user information table managed by the core unit.

When a new key 452 is depressed to register a new user, the user information window in FIG. 24 is displayed, and the name of a user to be registered and his or her password are entered in boxes 457 and 458.

Following this, one of items 459 to 562 is selected to set the operating limitations for the user.

When "None" 459 is selected, no limitations are set for the pertinent user.

When "Not permitted" 460 is selected, the pertinent user is prohibited from using the Web Pull Print function.

When "Permitted only for direct job" 461 is selected, a Web Pull Print request that is setup in accordance with a schedule schedule is not accepted by the digital copier 1.

When "Job No." 462 is selected, a numerical value is entered at a "Max jobs" 463. Thus, the upper limit count can be set for the number of Web Pull Print requests for the pertinent user that can be active in the digital copier 1 at any specific time.

An entry in the "Max jobs" 463 is also valid when the "Permitting only for direct job" 462 is selected.

When all the setups are completed and an OK button 464 is depressed, the screen is returned to the user registration window in FIG. 23. As all the setups have been completed.

When a Cancel button 465 is depressed, the setups are canceled and the window is returned to the user registration window in FIG. 23.

To change the setup contents for a user who is already registered, the pertinent user name is selected and a user change key 453 is depressed. Then, the user information window in FIG. 24 is displayed and shows the setup registered for the pertinent user. A desired change can be performed in the same manner as is described above.

To delete a user who is already registered, the pertinent user name is selected and the delete button 454 is depressed. Then, the user information that is registered is deleted.

FIG. 25 is a diagram showing, as a visual aid, a user information table of the storage unit (e.g., the memory 123) of the core 2, in which the user information is stored. The number of registered users is stored at the head of the user information table, and the user information sets follow in order.

Information consisting of four items, a user name, a password, a limited mode and maximum jobs, are stored in each user information set. An area having a fixed length is ensured as the storage of a user name and a password. When data is not as long as the fixed length, a null character (0h) is employed for compensation.

An area of one byte is ensured as the storage of a control mode. One byte code is stored in this area to uniquely represent one of modes: "None," "Not permitted," "Permitted only for direct job" and "Job No." An area of one byte is ensured as the storage of the maximum job count, and one of 0 to 255 is stored therein. When a value of 0 is stored, it represents no limitation of the job count.

In this embodiment, an explanation has been given for the user registration by the operation section 5 concerning the limitations of user information. The user registration is not limited to this. For example, a table concerning user information that includes limitations may be stored in advance in the storage unit of the core 2, or the contents of the table may be externally read and stored.

System Operation

Figure 26:
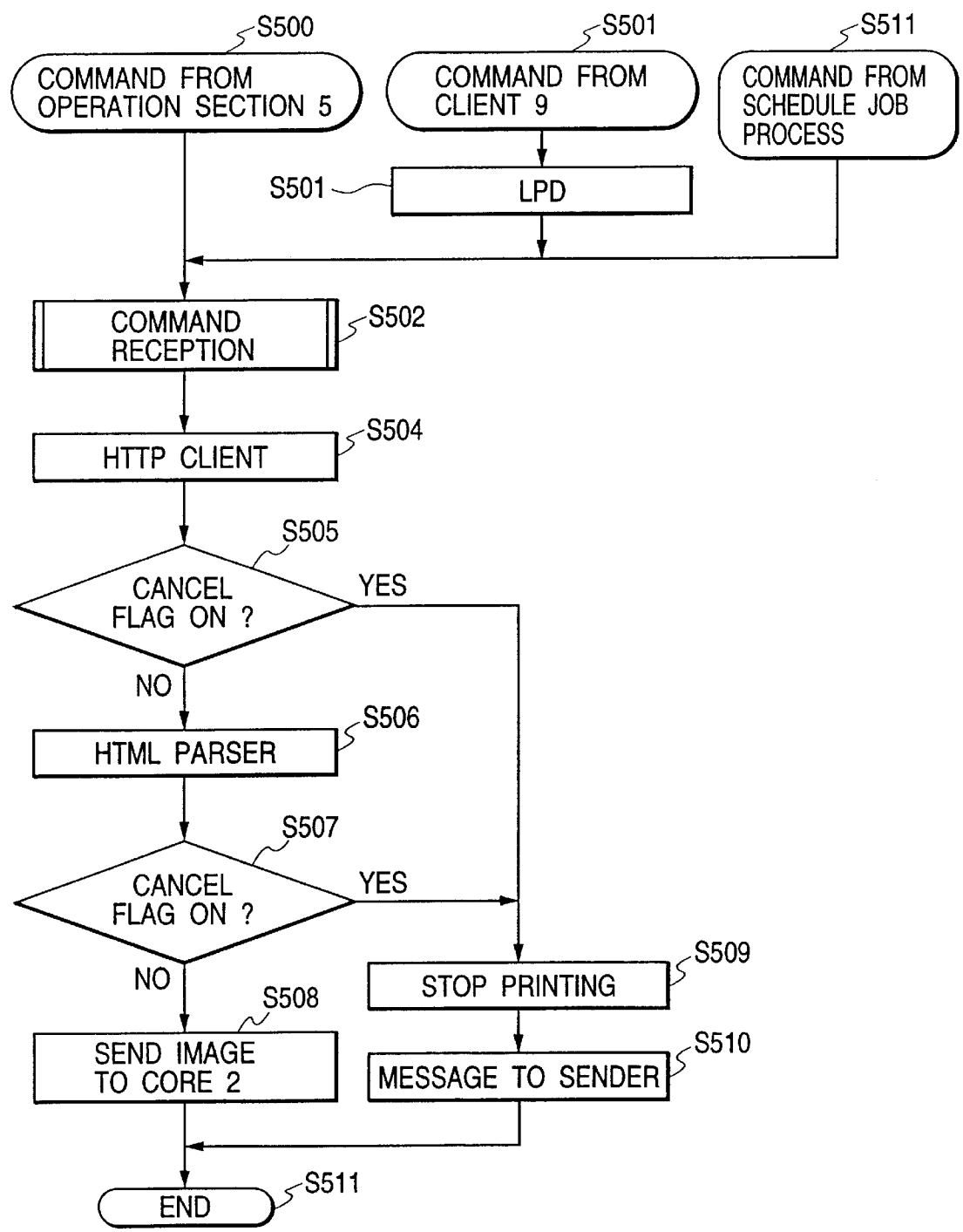
FIG. 26 is a flowchart showing the all processing performed by the system.
Figure 27:
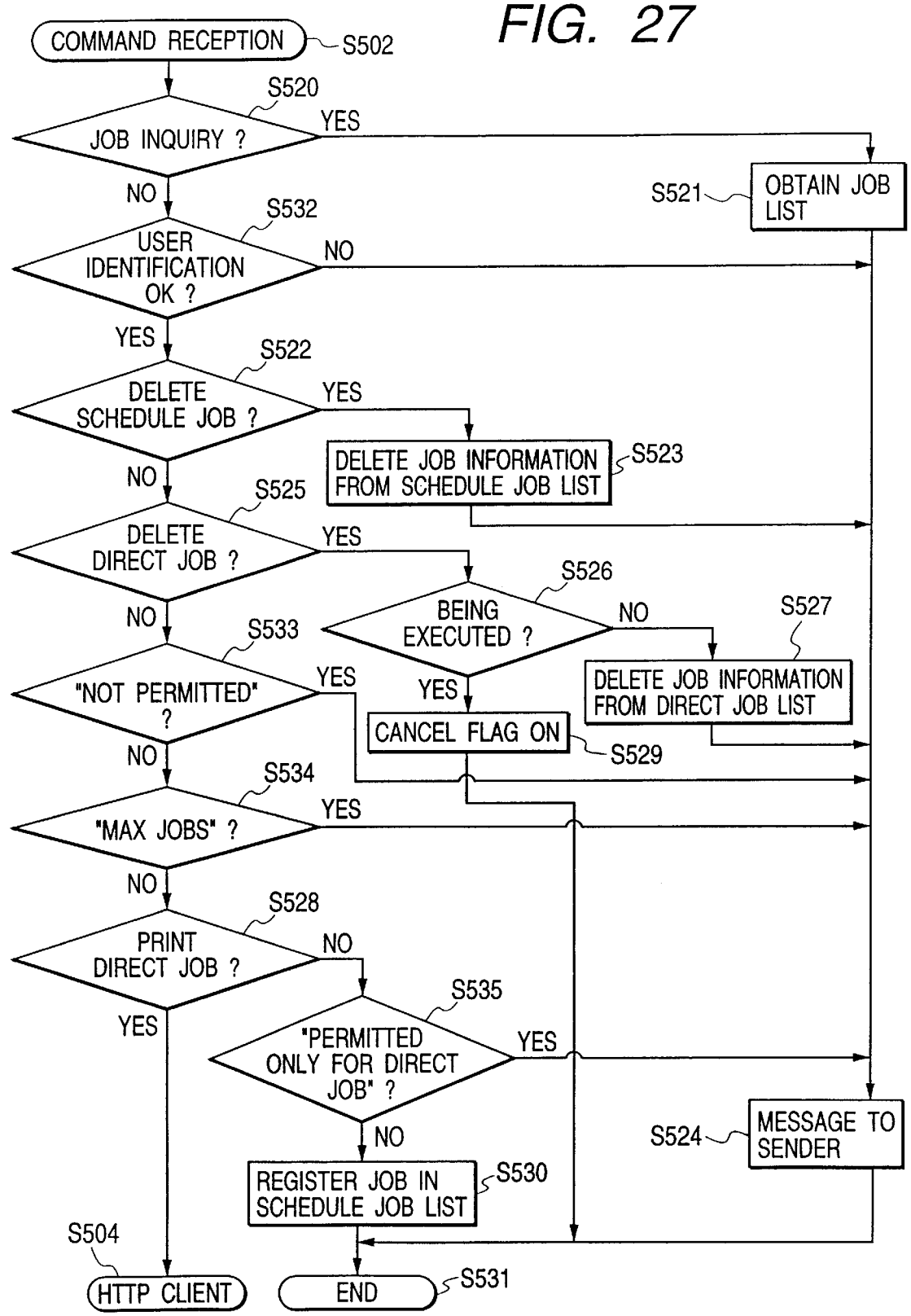
FIG. 27 is a flowchart showing the command reception processing.
Figure 28:
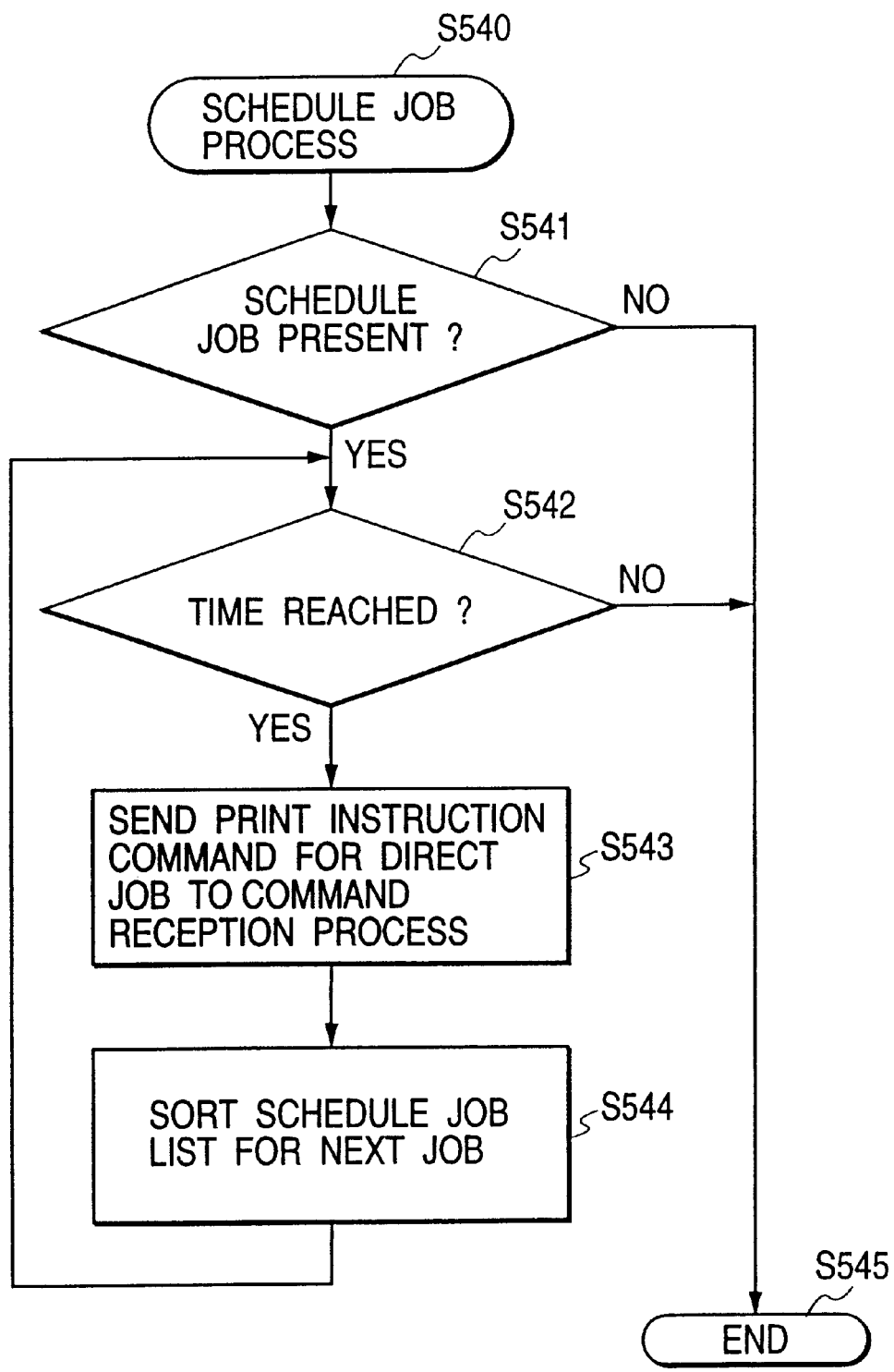
FIG. 28 is a flowchart showing the schedule job processing.

FIGS. 26 to 28 are flowcharts showing the processing for printing a home page of a WWW server 10 using a program, such as the HTML Parser 402 or the HTTP client 403.

The entire processing will now be described.

The print utility on the client terminal 9 and the digital copier 1 communicate with each other via an LPR protocol that is a higher TCP/IP protocol.

The LPD (Line Printer Deamon) is operated in the network interface 4 of the digital copier 1, and receives a Web Pull Print request, a job information request and a job deletion request from the print utility respectively as an LPR command, an LPQ command and an LPRM command (step S501).

At this time, the parameters set by the print utility are stored as character string data in the data file of an LPR command packet, which is transmitted to the LPD.

FIG. 29 is a diagram showing example data file B.

As is apparent from FIG. 29, the character string data begins with "START-OF-NETRETRIEVER PARAMETERS" and ends with "END-OF-NETRETRIEVER PARAMETERS".

The individual parameters are described in the form of "parameter name=value" (numbers on the right side in FIG. 29 correspond to serial numbers in the explanation of the above described items set by the print utility, and are not described in an actual data file). Only parameters "document title," "user name" and "password" that are set by the print utility are stored in a control file in the LPR command packet.

FIG. 30 is a diagram showing an example control file.

Data that are exchanged as an LPR command packet across the network are only the parameters required for printing. Thus, the amount of data is extremely small, compared with the prior art wherein home page data converted into a printable format are transmitted across the network.

The command reception process is constantly performed by the core 2 to receive a request command from the LPD, the operation section 5 and the schedule job process that will be described later.

The LPD converts the LPR command, the LPQ command or the LPRM command from the print utility into a format shown in FIGS. 31A to 31C, and transmits the resultant data to the command reception process (step 502).

The operation section 5 and the schedule job process transmit their request command in the same format (see FIGS. 31A to 31C) directly to the command reception process (steps S500 and S511). An identifier that represents a command type (LPR/LPQ/LPRM) is added to the head of the format. The command reception process examines the identifier to determine the command type, and analyses the command in accordance with the format (step S502).

FIG. 27 is a detailed flowchart showing the command reception process (step S502).

Upon receipt of a command, the core 2 determines whether it is a job inquiry command (step S520).

When the received command is a job inquiry command, the job list is obtained (step S521), and is transmitted as a message to the command transmission source (step S524). When the command transmission source is the print utility, the received data are displayed on the operating screen (see FIG. 12) of the print utility.

When the received command is not a job inquiry command, the user identification process is performed (step S532).

When the received command is a print command, the core 2 determines whether the user name and the password in the control file (see FIG. 30) are stored in the user information table.

When the received command is a delete command, the core 2 determines whether the user name and the password in the command (see FIG. 31C) are stored in the user information table.

When the user name and the password are not stored in the user information table, a message of that effect is transmitted to the command transmission source (step S524). Upon receipt of this message, the print utility or the operation section 5 displays the message to notify the user that the user is not registered.

Then, a check is performed to determine whether the received job is a delete command for a schedule job (step S522).

When the command is a schedule job delete command, the job information that corresponds to a designated job number is deleted from the schedule list (step S523), and a message of the schedule list after the pertinent job is deleted is transmitted to the command transmission source (step S524).

When the received command is not a delete command for a schedule job, a check is performed to determine whether it is a delete command for a direct job, i.e., a job to be executed on the instant (step S525).

If the received command is a direct job delete command, a check is performed to determine whether the designated job is currently being executed by the HTTP client or the HTML Parser (step S526).

When the designated job is not executed, the job information that corresponds to the designated job number is deleted from the direct job list (step S527). Then, a message for the resultant job list is transmitted to the command transmission source (step S524).

When the job to be deleted is currently being executed by the HTTP client or the HTML Parser, a cancel flag is set to terminate the processing (step S529).

If the received command is not a delete command for a direct job, it is assumed that this command is a print command, and a check is performed to determine whether limitation of "Not permitted" is set (step S533).

The core 2 examines the corresponding limitation mode for a user in the user information table. When the limitation of "Not permitted" is set, a message of that effect is transmitted to the command transmission source (step S524). Upon receipt of this message, the print utility or the operation section 5 displays the message to notify the user that the limitation of "Not permitted" is set.

The limitation is managed for each user, and is stored in the table as information for, for example, a user to whom color printing is permitted, a user to whom only monochrome printing is permitted, and a user to whom facsimile transmission is permitted. When a user to whom only monochrome printing is permitted transmits a color print job, message of "Not permitted" is transmitted as the result of determination. Program control moves to step S524.

Next, a check is performed to determine whether "Max jobs" is set for a user who transmitted the command. When the limitation of "Max jobs" is set, a check is further performed to determine whether the jobs that are already registered reach the maximum job count (step S534).

The core 2 examines the corresponding limitation mode for a user in the user information table. When the limitation of "Max jobs" is set, the core 2 further examines corresponding maximum number of jobs in the user information table. This value is compared with all the jobs for the same user in the schedule jot list/direct job list, and when both values are matched, the jobs currently registered reach the maximum job count. A message of that effect is transmitted to the command transmission source (step S524). Upon receipt of this message, the print utility or the operation section 5 displays the message to notify the user that the number of jobs has reached the maximum job count.

Following this, a check is further performed to determine whether received command is a direct job print command (step S528).

When the received command is a direct job print command, the processing is shifted to the HTTP client at step S504.

If the received command is not a direct job print command, it is assumed that this command is a print command for a schedule job, and a check is performed to determine whether the limitation of "Permitted only for direct job" is set for the user who issued that command (step S535).

The core 2 examines the corresponding control mode for the user in the user information table. When the limitation of "Permitted only for direct job" is set, a message of that effect is transmitted to the command transmission source (step S524). Upon receipt of the message, the print utility or the operation section 5 displays the message to notify the user that "Permitted only for direct job". When the limitation of "Permitted only for direct job" is not set, the pertinent job is registered in the schedule job list (step S530). The processing is thereafter terminated.

The HTTP client and the HTML Parser do not perform a plurality of jobs in parallel, and registers a job to the direct job list when another job process is currently being performed. The pertinent job is executed after the process is terminated.

A detailed explanation will now be given for the schedule job registration process (step S530).

First, the core 2 detects a schedule print mode in a received print command, and determines, in accordance with the mode, the actual date on which the Web Pull Print operation is to be started.

In "Once" mode, the date/time designated in the command is employed as the actual date for starting the Web Pull Print.

In "Weekly" mode, the actual date for starting the Web Pull Print is determined to be the date and the time that follows the registration date/time and are closest to the designated day.

For example, when the registration date/time is 1st (Saturday), 15:00 and the designated day/time is Saturday, Monday and Thursday, 12:00, the actual date for starting the Web Pull Print is the 3rd (Monday), 12:00.

In "Monthly" mode, the actual date for starting the Web Pull Print is determined to be the date/time that follows the registration date/time and is closest to the designated date.

For example, when the registration date/time is November 1st, 15:00 and the designated date/time is 1st, 12:00, the actual date for starting the Web Pull Print is December 1st, 12:00.

In "Repeat" mode, the actual date for starting the Web Pull Print is one of a plurality of times, which are calculated by using the designated start date/time and cycle, that follows the registration date/time and that is closest to the designated date.

For example, when the registration date/time is November 1st, 15:00 and when the designated start date/time is November 1st, 12:00 and the designated cycle is 3 days and 12 hours, the actual date for starting the Web Pull Print is November 5th, 0:00.

In this manner, the actual date for starting the Web Pull Print is determined in accordance with the mode, and the jobs are sorted in order beginning with a job having the earliest start date and time, and are registered in the schedule job list.

In FIG. 26, the HTTP client (step S504) is operated to obtain, from the WWW server 10, HTML data that are data of a home page, and image data.

After the operation of the HTTP client (step S504) is completed, a check is performed to determine whether the cancel flag in FIG. 26 is ON (step S505).

When the cancel flag is ON (set at step S529), the print stop process is performed (step S509), and a message of that effect is transmitted to the job transmission source (step S510). The processing is thereafter terminated (step S511).

When the cancel flag is not ON, program control is shifted to the HTMP Parser (step S506). The HTML Parser is a program for preparing an image by using the data obtained from the WWW server 10 in order to print the data at the printer 8.

When the operation of the HTML Parser has been completed, a check is performed to determine whether the cancel flag is ON (step S507).

If the cancel flag is ON, the print stop process is performed (step S509), and a message of that effect is transmitted to the job transmission source (step S510). The processing is thereafter terminated (step S511).

When the cancel flag is not ON, the image prepared by the HTML Parser is transmitted to the core 2 (step S508).

The core 2 transmits the received image data to the printer 8, and the data are printed on the sheet stored in the cassette 204 or 205. The Web Pull Print operation is thereafter terminated.

FIG. 28 is a flowchart showing the schedule job processing.

The schedule job processing is periodically initiated once every minute (step S540).

A check is performed to determine whether a schedule job is present in the schedule job list (step S541).

When a schedule job is present, a check is performed to determine whether the current date/time has reached the start date/time that is designated for the first job of the list (step S542).

When the current date/time has reached the designated date/time, the schedule print mode of the job is changed to the direct print mode, and a print instruction command is transmitted to the command reception process (step S502) (step S543). When the current date/time does not reach the designated date/time, the processing is terminated (step S545).

When the command is received at the command reception process (step S502), it is processed as a direct job, which is then transmitted to the HTTP client process (step S504). Thereafter, the same process as described above is performed.

When the print instruction command has been transmitted, the core 2 determines the date for starting the next Web Pull Print operation for a job that is to be printed, and registers the job again to the schedule job list (step S544).

A check is performed again to determine whether the current date/time has reached the start date/time that is designated for the first job on the list (step S542).

Al the schedule jobs for which the execution time has been reached can be performed by repeating the processes at steps S542 to S544.

In this embodiment, the digital copier 1 has been employed as output means and print data have been output by the printer 8. However, the means are not limited to them, and may be those for outputting other data.

Further, in this embodiment, the TCP/IP has been employed as a network communication protocol. However, the same effects can be obtained by using a communication protocol, such as IPX/SPX (Internetwork Packet eXchange/Sequenced Packet Exchange) or AppleTalk.

Furthermore, in this embodiment, the LPR/LPD has been employed as the communication protocol for the client terminal 9 and the digital copier 1. However, the same effect can be obtained by using a communication protocol, such as HTTP or FTP.

The present invention may be applied to a system constituted by a plurality of devices, or to an apparatus including a single device. The present invention can also be applied for a case wherein a program is supplied to a system or an apparatus to implement the present invention. In this case, the system or the apparatus reads a program for implementing the present invention from a recording medium, so that the system or the apparatus can obtain the effect of the present invention.

As is described above, according to the present invention, in an environment where a plurality of users share an apparatus that can access a server, the apparatus comprises means for limiting the functions that the users can employ, and means for controlling the access to the server in accordance with the limitations, so that a predetermined job is executed. Therefore, the number of jobs held by the apparatus can be reduced as possible, and the processing performance can be improved, without increasing the memory capacity for storing jobs.

An explanation will now be given for the processing performed when a home page is linked at the execution of the Web Pull Print.

When the "Monitor" button is selected on the operating screen in FIG. 6, the operating screen in FIG. 32 is displayed. Through communication with the digital copier 1, the print utility obtains information concerning a job that is spooled in the digital copier 1, and displays it on the screen. The user can read the display contents and understand the processing state of the spooled job. From among job information on the operating screen, the user selects and inverts a job to be deleted, and presses the "Delete" button. Then, the print utility transmits, to the digital copier 1, a deletion request command including the job number of the selected job. Upon receipt of the deletion request command, the digital copier 1 deletes one of the spooled jobs for which the job number is matched.

The URL is also displayed for confirmation of the access of the URL. When "Confirm Access" button 3201 is depressed, the digital copier 1 accesses the pertinent URL. When "Not Access" button 3202 is depressed, the digital copier 1 does not access the pertinent URL, and performs the next URL processing.

Figure 33:
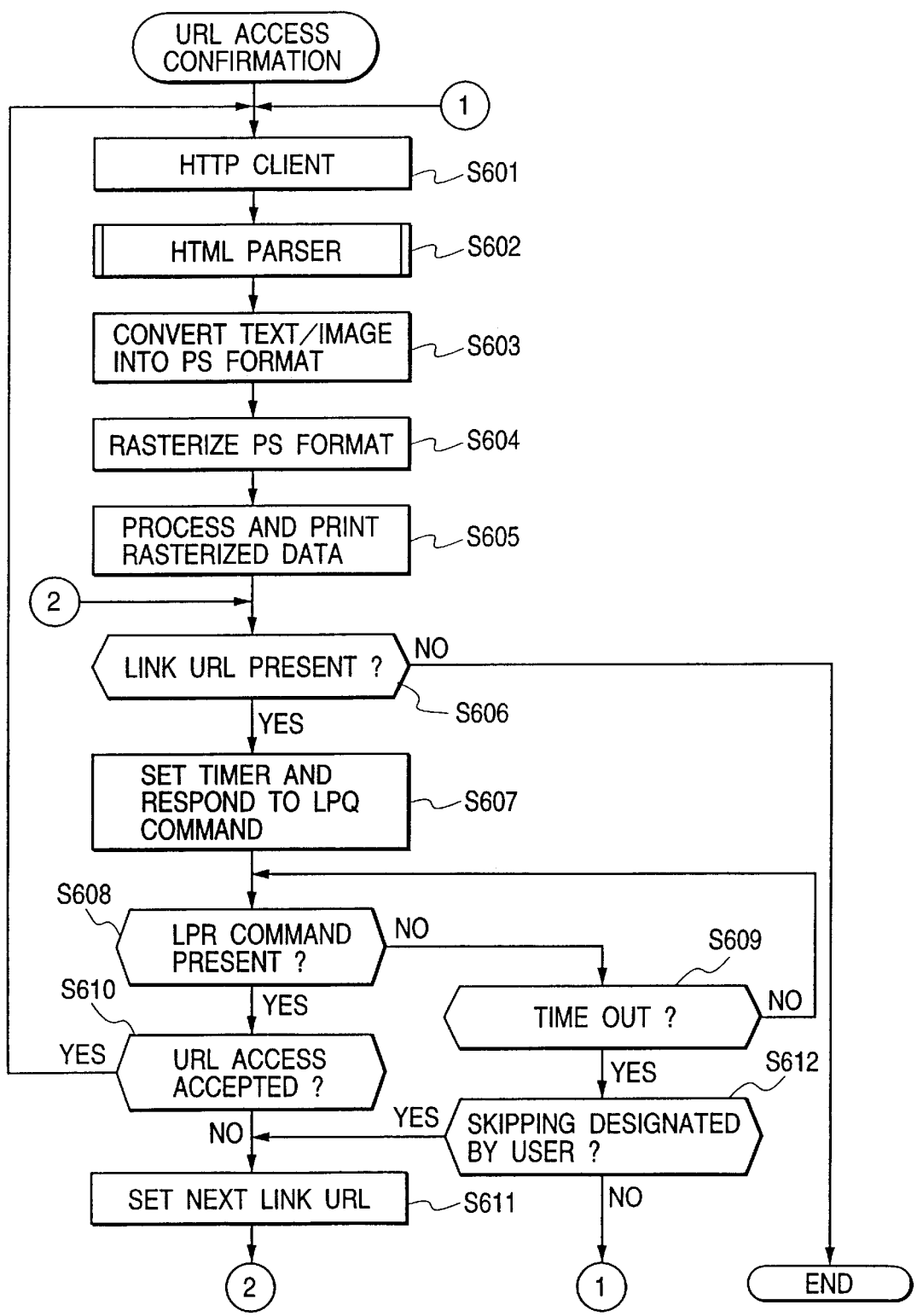
FIG. 33 is a flowchart showing the URL access confirmation processing.
Figure 34:
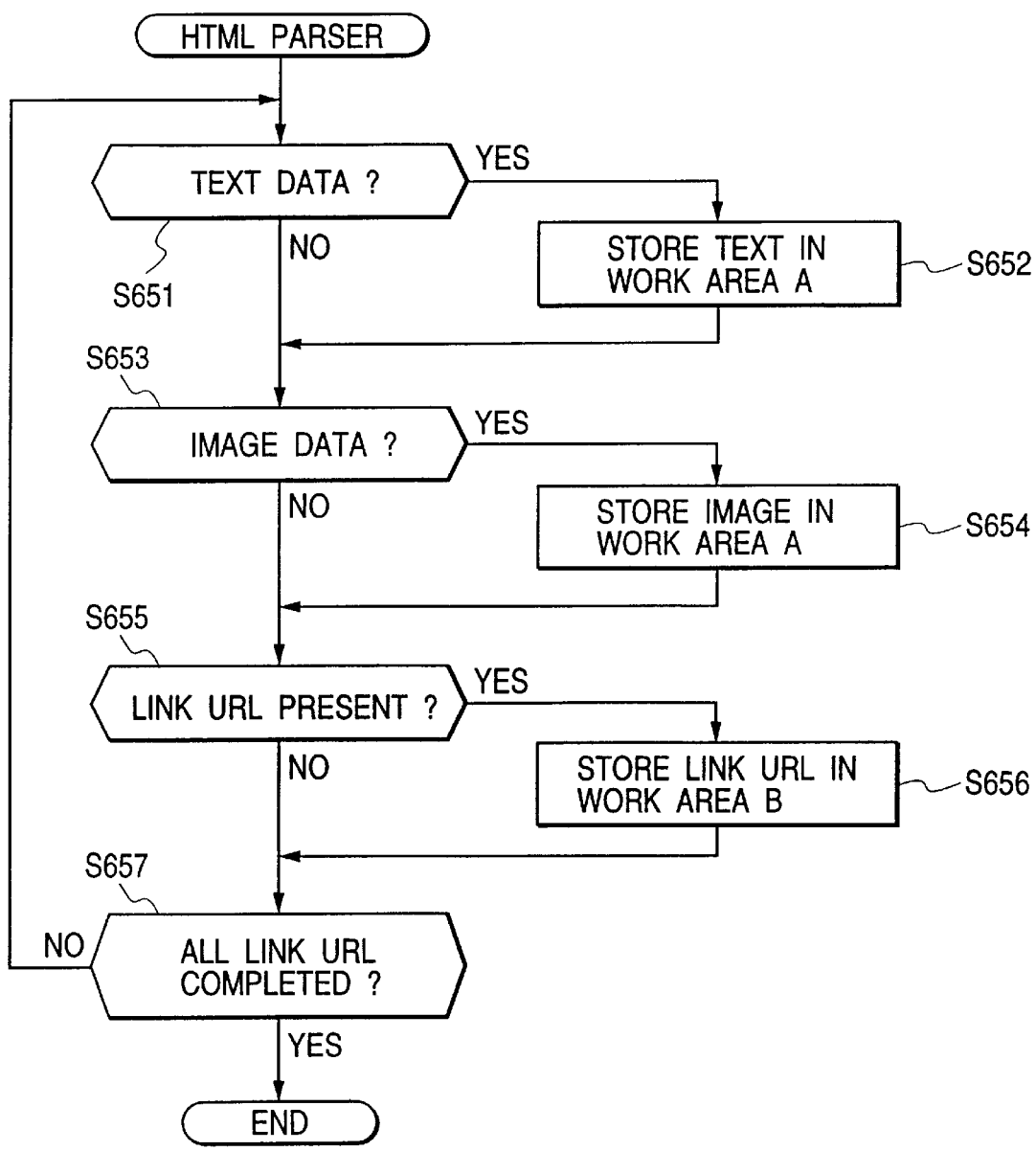
FIG. 34 is a flowchart showing the HTML parser processing.
Figure 35:
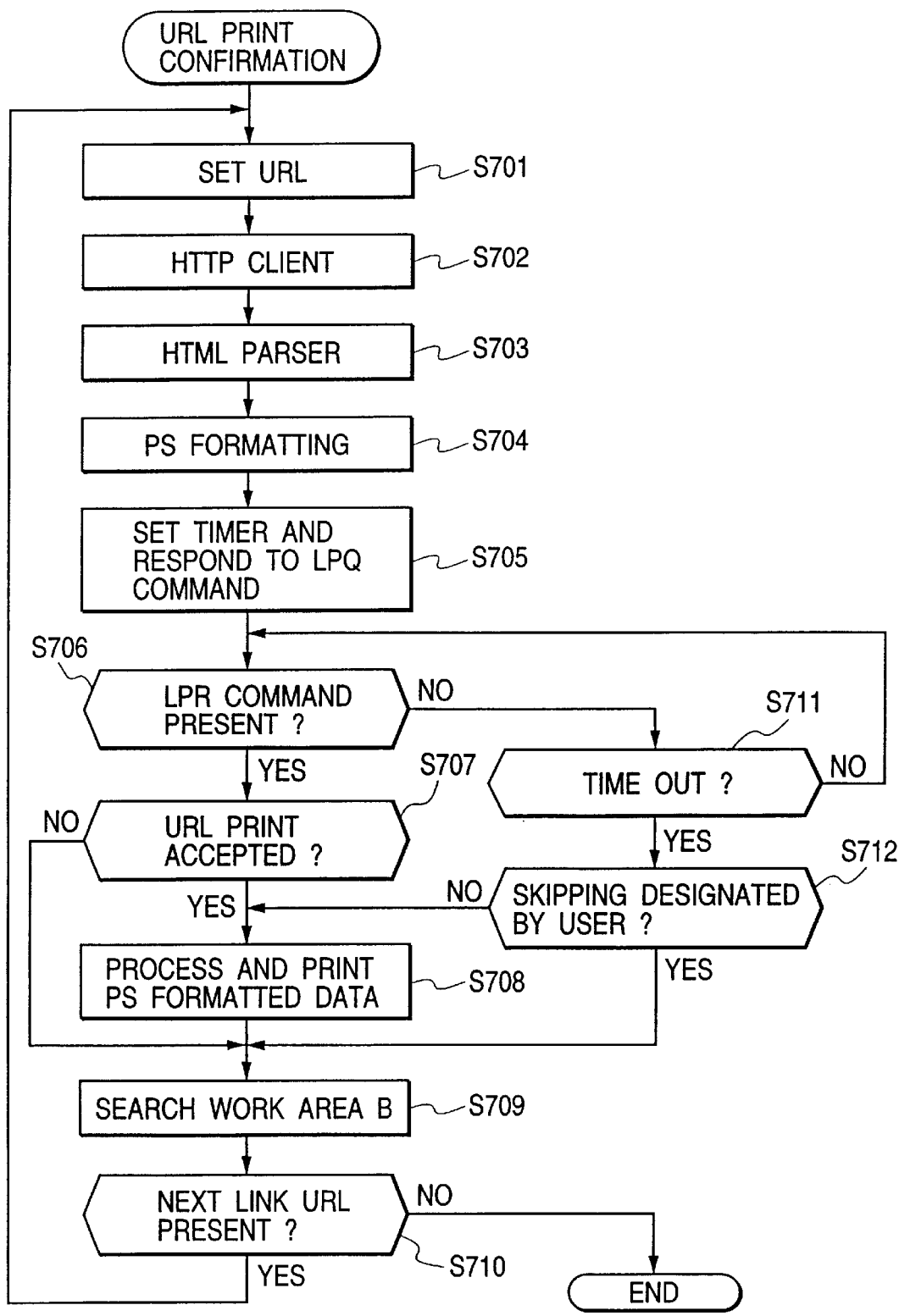
FIG. 35 is a flowchart showing the URL print confirmation processing.

FIGS. 33 to 35 are flowcharts showing the processing for printing a home page of the WWW server 10 by using a program, such as the HTML Parser 402 or the HTTP client 403.

FIG. 33 is a flowchart showing the URL access confirmation processing. In the flowchart in FIG. 33, the processes at steps S504 to S506 in FIG. 26 are described in another condition for URL access conformation.

First, a URL that is designated by a direct job print command is set. The designated URL on the WWW server 10 is accessed by the HTTP client 403 to obtain text data and image data, which are present at the URL, and a link URL (step S601).

The process of the HTML Parser 402 (step S602) will be first explained while referring to the flowchart in FIG. 34.

The HTML Parser 402 sequentially examines HTML data that are present in the designated URL, and stores, in work area A, text data and image data that are present in the designated URL (steps S651 to S654). If a link URL is present in the HTML data, the link URL is stored in work area B for the next process (step S655 and S656). This processing is performed in the same manner for all the link URLs that are present at the link level that is designated at step S506 in FIG. 7 (step S657).

A step S603 in FIG. 33, the PS generator of the formatter 6 converts the text data and image data in work area A into a printable PS format for the printer 8, and outputs the PS data. Then, the formatter 6 rasterizes the PS data (step S604). The data processor 124 performs a process, such as alteration of the scale, for the rasterized data, and the resultant data are printed by the printer 8 (step S605).

While the processes at steps S601 to S605 are unconditionally performed for data that are present in the URL that is directly designated by the user, those processes are performed for the data in the link URL only when the URL access acceptance, which will be described later, is obtained.

A check is performed to determine whether a link URL is stored in work area B (step S606). When a link URL is not stored, the processing is terminated. When a link URL is stored, the timer is set and, in response to an LPQ (job information request) command from the client terminal 9, the link URL is transmitted to the client terminal 9 as a request message in FIG. 36 for accepting the access of the link URL (step S607). The client terminal 9 displays the received link URL, and waits for an access permitting instruction or an access halt instruction from the user. When the client terminal 9 receives access permitting or access halt instruction from the user, the client terminal 9 transmits that information to the digital copier 1 as an LPR command shown in FIG. 37.

The digital copier 1 determines whether it has received the LPR command (step S608). When the LPR command in FIG. 37 is received, a check is performed to determine whether access acceptance information is included in that command (step S610). When the URL access is accepted, program control returns to step S601, and the same process is repeated for the next link URL.

When the URL access is not accepted, the next link URL is set (step S611). Then, program control returns to step S606, whereat there is a link URL following the link URL that has been set. In accordance with the determination, the access of data in the link URL, the existence of which is confirmed at step S606 in the previous process, is canceled.

When, at step S608, an LPR command is not received, a check is performed to determine whether the timer set at step S607 is time-out (step S609). When the timer is not time-out, program control returns to step S608, whereat an LPR command is waited for until the timer is time-out. When the timer is time-out at step S609, a check is performed to determine whether the currently processed link URL is a link URL that is designated by the user to skip the access of data at a pertinent address and to perform the process for the next link URL (step S612). When the current link URL is a link URL for which skipping is designated by the user, program control moves to step S661 to prohibit data present in the link URL.

When the current link URL is not the one for which skipping is designated, program control returns to step S601, whereat the same process is repeated for the next link URL. That is, when a response to the access acceptance request can not be obtained from the client terminal 9 within a predetermined period of time, the access is not halted, except that skipping is designated for the currently processed link URL. since access of data that the user does not desire is halted, unwanted printing can be avoided.

Avoiding of wasteful printing can be implemented by not only halting the access but also by halting printing of data that are accessed and obtained. This processing will be described while referring to the flowchart in FIG. 35. In the URL access acceptance processing in FIG. 33 and the URL print acceptance processing in FIG. 35, an access acceptance request and a print acceptance request are issued to the transmission source when a Web Pull Print request is issued not only by the client terminal 9, but also by the operation section 5.

Figure 39:
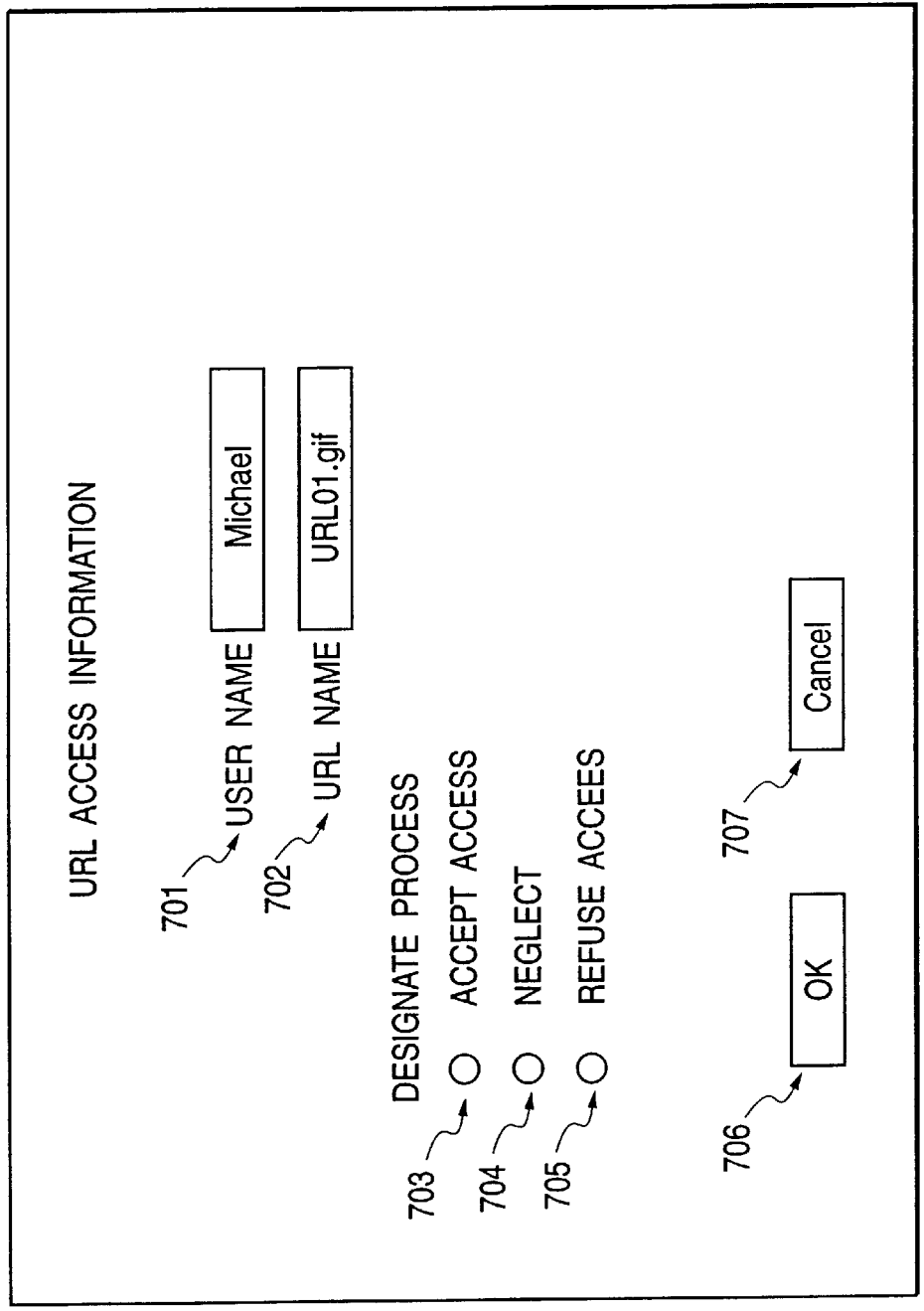
FIG. 39 is a diagram showing a display screen for client URL access information.

First, a URL that is designated by a direct job print command is set (step S701), and the HTTP client 403 is activated (step S702). Then, the HTML Parser 402 obtain URL data and examines URLs in the obtained data in the HTML form (step S703). When all the related URL data are collected, the PS format process is performed by the formatter (step S704). The timer is set, and in response to the LPQ command from the client terminal 9, the above described URL is transmitted to the client terminal 9 as an acceptance request message for accessing a link URL (step S705). In this case, the client terminal 9 displays the received URL as shown in FIG. 39, and waits for a print acceptance instruction or a print halt instruction from a user. The client terminal 9 transmits, to the digital copier 1, the print acceptance or print halt information received by the user as an LPR command (FIG. 38).

The digital copier 1 determines whether the LPR command has been received (step S706). When the LPR command is received, a check is performed to determine whether the received LPR command includes print acceptance information (FIG. 36) and the URL print acceptance is obtained (step S707). When the URL print acceptance is obtained, the data processor 124 performs a process, such as alteration of the scale, for the PS data, and the resultant PS data are printed by the printer 8 (step S708).

Then, work area B is searched (step S709) to determine whether the next link URL is present (step S710). When the next link URL is not present, the processing is terminated. When the next link URL is present, program control returns to step S701, whereat the same process is repeated for the next link URL.

When, at step S707, the URL print acceptance can not be obtained, program control skips step S708 and goes to step S709, whereat the printing is halted. When, at step S706, the LRP command is not received, a check is performed to determine whether the timer set at step S705 is time-out (step S711). When the timer is not time-out, program control returns to step S706, whereat an LRP command is waited for until the timer is time-out. When, at step S711, the timer is time-out, a check is performed to determine whether the currently processed link URL is designated by the user in advance to skip the printing of data at the pertinent address and to perform the process for the next link URL (step S712). When the currently processed link URL is designated for skipping, program control moves to step S709, whereat the data in the pertinent link URL are not printed.

When the currently processed link URL is not designated for skipping, program control moves to step S708, whereat the data present in the pertinent link URL are printed. When a response to the print acceptance request can not be received from the client terminal 9 within a predetermined period of time, printing is not halted, except that the current URL is designated for skipping. Since printing of data that the user does not desire is halted, wasteful printing can be avoided.

In this embodiment, the client terminal 9 or the operation section 5 that issued the Web Pull Print request is requested to accept accessing or printing of data that are present in a link URL, except for data that are present in a URL that is designated directly by the client terminal 9 or the operation section 5. Since the access or printing is halted when the acceptance is not obtained, wasteful printing can be avoided.

In this embodiment, TCP/IP has been employed as a network communication protocol; however, IPX/SPX or Apple Talk communication protocol may be employed. Also, LPR/LPD has been employed as the communication protocol for the client terminal 9 and the digital copier 1; however, a communication protocol, such as HTTP or FTP, may be employed. In addition, the LAN is employed for communication between the client terminal 9 and the digital copier 1; however, local connection, such as P1284, SCSI (Small Computer System Interface) or USB (User Serial Bus), may be employed.

As is described above, according to the present invention, an image processing apparatus, which accesses HTML (HyperText Markup Language) data on a WWW (World Wide Web) server in accordance with designated address information and which prints said HTML data, comprises:

acceptance requesting means for requesting of a source that specifies said address information an acceptance for the accessing of data other than those data that correspond to said designated address information and that are linked with said pertinent data; and halting means for, when said acceptance requested by said acceptance request means can not be obtained from said source that specifies said address information, halting access of said data other than data that correspond to said designated address information and that are linked with said pertinent data. Therefore, the user can obtain and print only data of a desired WWW server, and wasteful printing can be avoided.

What is claimed is:

1. An image processing apparatus comprising:
data acquisition means for accessing a server on a network in order to obtain image forming data from the server in accordance with a pull print request;
image forming means for processing, as a pull print job, the image forming data obtained by said data acquisition means;
identification data input means for entering identification data;
storage means for storing reference data that is to be compared with the identification data entered by said identification data input means;
identification means for comparing with the reference data stored in said storage means the identification data entered by said identification data input means in order to identify the identification data; and
control means for permitting or prohibiting image forming of the pull print job by said image forming means on the basis of a comparision result by said identification means,
wherein the reference data is stored in said storage means by a user unit and said control means permits image forming of the pull print job for a user specified by the reference data.

2. An image processing apparatus according to claim 1, wherein said image forming means forms an image in accordance with a job that is determined in advance.

3. An image processing apparatus according to claim 2, wherein according to the job, an image is formed based on data obtained by said data acquisition means at a time that is designated in advance.

4. An image processing apparatus according to claim 2, wherein according to the job, an image is formed based on data obtained by said data acquisition means at a time interval that is designated in advance.

5. An image processing apparatus according to claim 2, wherein the maximum number of jobs to be executed is determined in advance.

6. An image processing apparatus according to claim 2, wherein the contents of the job are instructed by a client.

7. An image processing apparatus according to claim 1, further comprising instruction means for instructing instant execution of image forming, wherein in accordance with an instruction issued by said instruction means, said identification means identifies information and said data acquisition means obtains data.

8. An image processing apparatus according to claim 1, further comprising access destination entry means for entering URL information for a server that is to be accessed, wherein said data acquisition means accesses the server based on the URL entered by said access destination entry means.

9. An image processing apparatus according to claim 1, which is a copier.

10. An image processing apparatus according to claim 9, further comprising an operation section for instructing a copy mode, in which an image is formed for a document that is read, and a print mode, in which data obtained from the server are printed, wherein said image forming means forms an image in accordance with a mode that is specified by said operation section.

11. An image processing apparatus according to claim 9, wherein a client is connected to the network, and the client is capable of setting a parameter concerning image forming performed by said image forming means.

12. An image processing apparatus according to claim 9, wherein a client is connected to the network, and the client is capable of transmitting, to said image processing apparatus, information required by said data acquisition means to obtain data.

13. An image processing apparatus according to claim 9, wherein a client is connected to the network, and the client instructs performance of a job by said image processing apparatus, and said image forming means forms an image in accordance with the contents of the job that are specified.

14. An image processing apparatus according to claim 1, wherein data for which image forming is to be processed includes HTML data.

15. An image processing apparatus according to claim 1, wherein data for which image forming is to be processed includes a URL for a server.

16. An image processing apparatus according to claim 1, wherein the identification information is a user name and a password.

17. A method for controlling an image processing apparatus comprising:
 a data acquisition step, of accessing a server on a network in order to obtain image forming data from the server in accordance with a pull print request;
 an image forming step, of processing, as a pull print job, the image forming data obtained in said data acquisition step;
 an identification data input step, of entering identification data;
 a storage step, of storing reference data to be compared with the identification information entered in said identification data input step;
 an identification step, of comparing the identification data entered in said identification data input step with the reference data stored in said storage step to identify the identification information; and
 a control step, of permitting or prohibiting image forming of the pull print job in said image forming step on the basis of a comparison result in said identification step,
 wherein the reference data is stored in said storage step by a user unit and said control step permits image forming of the pull print job for a user specified by the reference data.

18. A method according to claim 17, wherein in said image forming step, an image is formed in accordance with a job that is determined in advance.

19. A method according to claim 18, wherein according to the job, an image is formed based on data obtained from the server at a time that is designated in advance.

20. A method according to claim 18, wherein according to the job, an image is formed based on data obtained from the server at a time interval that is designated in advance.

21. A method according to claim 18, wherein the maximum number of jobs to be executed is determined in advance.

22. A method according to claim 18, wherein the contents of the job are instructed by a client.

23. A method according to claim 17, further comprising a step of instructing instant execution of image forming, wherein identification is performed in accordance with an instruction and data is obtained.

24. A method according to claim 17, further comprising a step of entering URL information for a server that is to be accessed, wherein, at said entering step, the server is accessed based on the URL that is entered.

25. A method according to claim 17, wherein the image processing apparatus is a copier.

26. A method according to claim 25, further comprising a step for instructing a copy mode, in which an image is formed for a document that is read, and a print mode, in which data obtained from the server are printed, wherein an image is formed in accordance with a mode that is specified at said mode step.

27. A method according to claim 25, wherein a client is connected to the network, and wherein the client is capable of setting a parameter concerning image forming.

28. A method according to claim 25, wherein a client is connected to the network, and the client is capable of transmitting, to the image processing apparatus, information required to obtain data.

29. A method according to claim 25, wherein a client is connected to the network, and the client instructs performance of a job by the image processing apparatus, and an image is formed in accordance with the contents of the job that are specified.

30. A method according to claim 17, wherein data for which image forming is to be processed include HTML data.

31. A method according to claim 17, wherein data for which image forming is to be processed include a URL for a server.

32. A method according to claim 17, wherein the identification information is a user name and a password.

33. A computer-readable memory medium which stores an image processing program, said program comprising:
 code for a data acquisition step, of accessing a server on a network in order to obtain image forming data from the server;

code for an image forming step, of processing as a pull print job, the image forming data obtained in said data acquisition step;

code for an identification data input step, of entering identification data;

code for a storage step, of storing reference data to be compared with the identification information entered in said identification data input step;

code for an identification step, of comparing the identification data entered in said identification data input step with the reference data stored at said storage step to identify the identification information; and code for a control step, of permitting or prohibiting image forming of the pull print job in said image forming step on the basis of a comparison result in said identification step, wherein the reference data is stored in said storage step by a user unit and said control step permits image forming of the pull print job for a user specified by the reference data.

34. An image processing apparatus, said apparatus comprising:

data acquisition means for accessing a server on a network in accordance with address information included in a pull print request in order to obtain image forming data from the server;

image forming means for processing, as a pull print job, the image forming data obtained by said data acquisition means;

instruction input means for inputting a link print instruction that instructs said image processing apparatus to print data linked with the image forming data specified by the address information; and control means for controlling said data acquisition means to obtain the data linked with the image forming data in response to the link print instruction input by said instruction input means.

35. An image processing apparatus according to claim 34, further comprising acceptance request means for requesting a designation source for the address information to accept a printing job for data other than that data which correspond to the address information and that is linked to the data.

36. An image processing apparatus according to claim 34, wherein when the image forming data obtained by said data acquisition means includes link information, said acceptance request means requests an acceptance be granted by transmitting a URL (Uniform Resource Locator) for the data linked with the link information to the designation source of the address information.

37. An image processing apparatus according to claim 34, wherein said instruction input means inputs the link print instruction from a computer connected via the network to said image processing apparatus.

38. An image processing apparatus according to claim 34, wherein said instruction input means inputs the link print instruction from a computer locally connected to said image processing apparatus.

39. An image processing apparatus according to claim 34, wherein said instruction input means inputs the link print instruction from an operation section provided on said image processing apparatus, with a display function.

40. An image processing apparatus according to claim 35, wherein said control means controls said data acquisition means not to access the linked data when a response to an acceptance request issued by said acceptance request means is not received from the address information designation source within a predetermined period of time.

41. An image processing apparatus according to claim 34, wherein the address information designation source employs a GUI (Graphical User Interface) to designate the address information.

42. An image processing apparatus according to claim 34, wherein the address information designation source reserves an access to designate the address information.

43. An image processing apparatus according to claim 34, wherein the address information designation source specifies the address information together with print form information.

44. An image processing method for controlling an image processing apparatus, said method comprising:

a data acquisition step, of accessing a server on a network in accordance with address information included in a pull print request in order to obtain image forming data from the server;

an image forming step, of processing, as a pull print job, the image forming data obtained in said data acquisition step;

an instruction input step, of inputting a link print instruction that instructs the image processing apparatus to print data linked with the image forming data specified by the address information; and a control step, of controlling said data acquisition step to obtain the data linked with the image forming data in response to the link print instruction input in said instruction input step.

45. A method according to claim 44, further comprising an acceptance request step, of requesting a designation source of the address information to accept a printing job for data other than that data which correspond to the address information and that is linked to the data.

46. A method according to claim 44, wherein when the image forming data obtained in said data acquisition step includes link information, said acceptance request step requests acceptance be granted by transmitting a URL (Uniform Resource Locator) for the data linked with the link information to the designation source of the address information.

47. A method according to claim 44, wherein said instruction input step includes inputting the link print instruction from a computer connected via the network to the image processing apparatus.

48. A method according to claim 44, wherein said instruction input step includes inputting the link a computer locally connected to the image processing apparatus.

49. A method according to claim 44, wherein said instruction input step includes inputting the link print instruction from an operation section, provided on the image processing apparatus, with a display function.

50. A method according to claim 45, wherein at said control step, includes controlling said data acquisition step not to access the link data when a response to an acceptance request issued in said acceptance request step is not received from the address information designation source within a predetermined period of time.

51. A method according to claim 44, wherein the address information designation source employs a GUI (Graphical User Interface) to designate the address information.

52. A method according to claim 44, wherein the address information designation source reserves an access to designate the address information.

53. A method according to claim 44, wherein the address information designation source specifies the address information together with print form information.

54. A computer-readable memory medium which stores a program for controlling an image processing apparatus, said program comprising:

code for a data acquisition step, of accessing a server on a network in accordance with address information included in a pull print request in order to obtain image forming data from the server;

code for an image forming step, of processing, as a pull print job, the image forming data obtained in said data acquisition step;

code for an instruction input step, of inputting a link print instruction that instructs the image processing apparatus to print data linked with the image forming data specified by the address information; and code for a control step, of controlling said data acquisition step to obtain the data linked with the image forming data in response to the link print instruction input in said instruction input step.

\* \* \* \* \*

UNITED STATES PATENT AND TRADEMARK OFFICE
CERTIFICATE OF CORRECTION

PATENT NO. : 6,791,703 B1  
DATED : September 14, 2004  
INVENTOR(S) : Toru Maeda et al.

It is certified that error appears in the above-identified patent and that said Letters Patent is hereby corrected as shown below:

<u>Title page,</u>  
Item [30], Foreign Application Priority Data, "Jun. 5, 1909.... 10-172137" should read -- Jun. 5, 1998 .... 10-172137 --.

<u>Column 1,</u>  
Line 22, "are-stored," should read -- are stored, --.

<u>Column 8,</u>  
Line 61, "printing. (28)" should read -- printing --; and  
Line 62, "Orientation" should read -- (28) Orientation --.

<u>Column 19,</u>  
Line 3, "Exchange)" should read -- eXchange) --.

Signed and Sealed this

Ninth Day of May, 2006

JON W. DUDAS  
*Director of the United States Patent and Trademark Office*